US008060392B2

(12) United States Patent
Musso et al.

(10) Patent No.: US 8,060,392 B2
(45) Date of Patent: Nov. 15, 2011

(54) PROFESSIONAL DEVELOPMENT REGISTRY SYSTEM

(75) Inventors: Michael Musso, Alpharetta, GA (US); Glenn Ewing, Dacula, GA (US)

(73) Assignee: ChildCare Education Institute, LLC, Duluth, GA (US)

( * ) Notice: Subject to any disclaimer, the term of this patent is extended or adjusted under 35 U.S.C. 154(b) by 1030 days.

(21) Appl. No.: 11/931,630

(22) Filed: Oct. 31, 2007

(65) Prior Publication Data

US 2009/0112674 A1  Apr. 30, 2009

(51) Int. Cl.
 *G06Q 40/00* (2006.01)
(52) U.S. Cl. ........................................ 705/7.11; 705/7.1
(58) Field of Classification Search .................. None
 See application file for complete search history.

(56) References Cited

U.S. PATENT DOCUMENTS

| | | | |
|---|---|---|---|
| 5,978,767 A * | 11/1999 | Chriest et al. ............... 705/328 |
| 6,208,832 B1 | 3/2001 | Remschel |
| 6,411,796 B1 | 6/2002 | Remschel |
| 6,755,659 B2 | 6/2004 | LoSasso et al. |
| 6,772,081 B1 | 8/2004 | Gedlinske et al. |
| 6,778,807 B1 | 8/2004 | Martino et al. |
| 6,944,596 B1 | 9/2005 | Gray et al. |
| 7,085,800 B2 | 8/2006 | Abbott et al. |
| 7,167,822 B2 | 1/2007 | Ueda |
| 2002/0046074 A1 * | 4/2002 | Barton .............................. 705/8 |
| 2002/0052860 A1 | 5/2002 | Geshwind |
| 2002/0184085 A1 | 12/2002 | Lindia et al. |
| 2003/0055699 A1 | 3/2003 | O'Connor |
| 2003/0177027 A1 * | 9/2003 | DiMarco ........................ 705/1 |
| 2003/0182171 A1 | 9/2003 | Vianello |
| 2003/0187725 A1 * | 10/2003 | Jotkowitz ..................... 705/11 |
| 2004/0009461 A1 | 1/2004 | Snyder et al. |
| 2004/0115596 A1 | 6/2004 | Snyder et al. |
| 2004/0161728 A1 | 8/2004 | Benevento, II et al. |
| 2004/0229199 A1 | 11/2004 | Ashley et al. |
| 2005/0015291 A1 * | 1/2005 | O'Connor ...................... 705/8 |
| 2005/0096973 A1 * | 5/2005 | Heyse et al. ................. 705/11 |
| 2005/0114203 A1 * | 5/2005 | Savitsky et al. .............. 705/11 |
| 2005/0170321 A1 * | 8/2005 | Scully ......................... 434/219 |
| 2006/0195335 A1 * | 8/2006 | Christian et al. .............. 705/1 |
| 2007/0011027 A1 | 1/2007 | Melendez |
| 2007/0061180 A1 | 3/2007 | Offenberg |
| 2007/0094121 A1 | 4/2007 | Dion |
| 2008/0109299 A1 * | 5/2008 | Khetarpal et al. ............ 705/11 |
| 2009/0089154 A1 * | 4/2009 | Dion ........................... 705/11 |

FOREIGN PATENT DOCUMENTS

| | | |
|---|---|---|
| WO | WO 9822864 | 5/1998 |
| WO | WO 0182150 | 11/2001 |
| WO | WO 0182268 | 11/2001 |
| WO | WO 03049064 | 6/2003 |
| WO | WO 2004023353 | 3/2004 |

\* cited by examiner

*Primary Examiner* — Thomas Dixon
*Assistant Examiner* — Benjamin S Fields
(74) *Attorney, Agent, or Firm* — Ice Miller L.L.P.

(57) ABSTRACT

A professional development registry system comprising a processor and a storage medium operably connected to the processor, wherein the storage medium is capable of receiving and storing data representative of a first career ladder, data representative of at least one participant, data representative of at least one scholarship request, and data representative of at least one training event, and wherein the processor is operable to process said data and generate at least one report comprising at least part of said data.

61 Claims, 26 Drawing Sheets

Register Now – Enter Your Personal Information

*Denotes Required Information

| | | |
|---|---|---|
| * First Name: | Jane | — 302 |
| * Last Name: | Doe | — 304 |
| * Email Address: | jdoe@myemail.com | — 306 |
| * Re-Type Email Address: | jdoe@myemail.com | — 308 |
| * Desired Password: (6 character minimum) | ****** | — 310 |
| * Re-Type Desired Password: | ****** | — 312 |
| * Home Address 1 | 123 My House Lane | — 314 |
| Home Address 2 | | — 316 |
| * State: | CONNECTICUT ▼ | — 318 |
| * City: | Hamden | — 320 |
| * Zip: | 012345 | — 322 |
| * Home Phone: | 123 - 456 - 7899 | — 324 |
| * Work Phone: | 123 - 456 - 7899 | — 326 |

PROFESSIONAL DEVELOPMENT REGISTRY SYSTEM

BACKGROUND

The disclosure of the present application relates to registries, and more particularly to a professional development registry system.

Keeping track of today's numerous professional development requirements has become quite complex. Depending on an individual's particular professional field, he or she may be required to meet certain personal or general criteria, to participate in a number of continuing education courses in a given time period, and to attend a number of training courses to train the individual in a new or changing facet of the specific profession. Types of personal or general criteria that may be applicable to a particular profession or position include factors such as age and the absence of or limited offenses in criminal or traffic matters, for example.

Professional development requirements exist in several professions. For example, licensed attorneys are required to take a specific number of continuing legal education (CLE) courses to meet their annual or then-current period requirements to maintain their legal registrations. The CLE courses may cover one or more substantive aspects of the law, or may cover more general aspects of the legal profession, i.e. legal ethics and client trust fund management, or be required based on the years of experience of attorneys. As another example, licensed child care providers may be required to receive a certain amount of certified training throughout their career.

Teaching professionals are also often required to attend specific professional development training seminars in a given time period. Such training events are generally required to assist the professionals with current developments in his or her field, and to refresh the professional regarding what he or she may have learned in the past but does not commonly apply in their daily teaching duties.

Traditional systems used to keep track of professional development requirements are paper-based and rely heavily on manual data entry. Organizations maintaining such records typically have one or more staff members dedicated to data entry, and oftentimes the systems used require re-entry of the same data previously recorded on another paper document. In addition, traditional systems typically only allow for limited administrative access to data. An administrator would need to sort through several separate paper documents in order to obtain data pertinent to a particular inquiry, such as whether an individual is current in meeting his/her professional development requirements.

Other professional development registries than the manual systems referenced above may currently be utilized. For example, it is possible that a generic professional development registry may exist that consists of a simple database including, but not limited to, general identifying information for the professional and the overall level of education for developmental purposes.

A registration system may provide access to curriculum information. An example may be an online environment accessible by college students to review available educational courses and eventually register for such courses once a registration window opens for the students. Individuals intending to meet their requirements may access such curriculum information, including, but not limited to, the subject matter of a particular training course and the time(s) and date(s) for which the training course is available. However, such systems for the identification of one or more professional development courses are not connected to or integrated with systems for identifying the requirements necessary for a professional to meet his or her future development requirements.

In addition to the foregoing, a separate system may be utilized to store information relating to upcoming training events and seminars, and notices may periodically be sent to participants of the system to remind them of events to occur in the near future. Yet another system may be utilized to maintain training event attendance records. Such information may be made available by sign-in sheets at a training event or attendance sheets completed by attendees of a training event. That attendance information may then be entered into a database by a staff member so that an administrator may be able to determine which training events were attended by a particular participant.

Management of such training events is typically handled either outside of the aforementioned systems or somehow tied to a system providing access to curriculum information. Administrators for such events are required to plan training seminars, identify available dates, times, and locations for such seminars, identify seminar instructors/facilitators, prepare course materials, and manage the seminars themselves. Some of these tasks may be automated, but typically the tasks outside of "posting" an available seminar on a system to be accessed by individuals seeking seminars are managed outside of such a system.

Individuals may also seek scholarship assistance to attend training seminars. A traditional scholarship request typically includes several paper-based steps. The first step is the completion of paper-based documentation by the requester to make such a request. That documentation is then submitted to a receiving office for scholarship requests, which is then reviewed and entered into some sort of larger paper or electronic database. The requester may also then obtain some form of receipt from the receiving office to let the requester know that the scholarship request was received. If any information was missing from the request, the requester may receive a letter from the receiving office notifying the requester of such missing information and requesting that the information be provided as soon as possible. The requester may then provide the missing information and wait a certain period (typically several weeks to several months) until the requester is informed regarding whether or not the scholarship request was approved. As can be understood, such a system is slow, inefficient, and time consuming to utilize.

Recent systems have utilized simple databases to manage individual aspects of professional development. The aforementioned systems that may relate to professional development requirements typically stand alone from one another, without any interrelationships between the identification and recordation of professional development data, personal and/or general criteria, the availability of training seminars, the recordation of seminar attendance, the processing of scholarship requests, and the overall management of training events by trainers. It is therefore desired to develop a comprehensive professional development registry system to manage each of these tasks.

BRIEF SUMMARY

The present application relates to registries, and more particularly to a professional development registry system.

An exemplary professional development registry system may comprise hardware in bidirectional communication with one another of a network. For example, a professional development registry system may comprise a registry provider system and one or more client systems operably coupled to one another via bidirectional communication link over the Internet.

In an embodiment of a professional development registry system, the system comprises a system for managing a career ladder of a participant, comprising a processor, a storage medium operably connected to the processor wherein the storage medium is capable of receiving and storing data representative of a first career ladder and data representative of at least one participant, wherein the data representative of a first career ladder comprises data representative of a plurality of levels, each of the data representative of a plurality of levels comprising data representative of at least one requirement, and wherein the data representative of at least one participant comprises data representative of at least one participant attribute, and wherein the processor is operable to compare the data representative of at least one participant to the data representative of a first career ladder to determine if data representative of at least one participant attribute satisfies any or all of the data representative of at least one requirement. In another embodiment of a system for managing a career ladder of a participant, the data representative of at least one requirement comprises data representative of a requirement for advancement of at least one participant in accordance with the data representative of a first career ladder.

In another embodiment of a system for managing a career ladder of a participant, the data representative of at least one requirement comprises data representative of at least one parameter. In yet another embodiment, the data representative of at least one parameter comprises data representative of at least one completed training session. In even another embodiment, the data representative of at least one participant further comprises data representative of at least one from the group consisting of a username, an identification number, a first name, a last name, and an email address.

Another embodiment of a system for managing a career ladder of a participant further comprises data representative of a second career ladder, wherein said data is capable of being stored in and retrieved from the storage medium, wherein said data comprises data representative of a plurality of levels and wherein the data representative of a plurality of levels comprises data representative of at least one requirement, and wherein the processor is further operable to compare the data representative of at least one participant to the data representative of a second career ladder to determine if data representative of at least one participant attribute satisfies any or all of the data representative of at least one requirement of the data representative of a plurality of levels of the data representative of a second career ladder.

In another embodiment, the system for managing a career ladder of a participant further comprises a program stored upon the storage medium, said program operable by the processor upon the data representative of at least one career ladder. In yet another embodiment, the system is operably connected to at least one administrator computer and at least one participant computer through a network. In another embodiment, the system is coupled within the administrator computer. In even another embodiment, the network comprises the Internet.

In another embodiment of a system for managing a career ladder of a participant, the system comprises a processor and a storage medium operably connected to the processor, wherein the storage medium capable of receiving and storing data representative of a first career ladder and data representative of at least one participant, and wherein the data representative of a first career ladder comprises data representative of a plurality of levels, each of the data representative of a plurality of levels comprising data representative of at least one requirement, and each of the data representative of at least one requirement comprising data representative of a requirement for advancement of at least one participant in accordance with the data representative of a first career ladder, and wherein the data representative of at least one participant comprises data representative of at least one participant attribute, and wherein the data representative of at least one participant further comprises data representative of at least one from the group consisting of a username, a first name, a last name, and an email address, and wherein the processor is operable to compare the data representative of at least one participant to the data representative of a first career ladder to determine if data representative of at least one participant attribute satisfies any or all of the data representative of at least one requirement.

In an embodiment of a system for processing scholarship requests, the system comprises a processor, a storage medium operably connected to the processor, the storage medium capable of receiving and storing data representative of at least one scholarship request and data representative of at least one scholarship requirement, wherein the data representative of at least one scholarship request comprises data representative of at least one training session and data representative of a confirmation that any term(s) and condition(s) applicable to the scholarship request has/have been accepted by the requester, and wherein a determination if a scholarship request related to the data representative of at least one scholarship request should be approved or denied based upon at least one approval process, the at least one approval process performed by an administrator or performed by the processor based upon data representative of at least one scholarship request and data representative of at least one scholarship requirement, and wherein the processor is operable to report a status of scholarship request to a requester. In another embodiment of a system for processing scholarship requests, the data representative of at least one scholarship request further comprises data representative of at least one scholarship requester.

In another embodiment of a system for processing scholarship requests, the data representative of at least one scholarship requester comprises data representative of at least one from the group consisting of a username, an identification number, a first name, a last name, and an email address. In yet another embodiment, the data representative of at least one training session comprises data representative of at least one from the group consisting of a course number identifier, a course code identifier, a course title identifier, a semester term identifier, a semester year identifier, a scholarship request identifier, and a scholarship request date. In even another embodiment, the data representative of at least one scholarship request further comprises data representative of at least one scholarship amount requested.

In an embodiment of a system for processing scholarship requests, the processor is further operable to compare data representative of at least one scholarship request to the data representative of at least one scholarship requirement to determine an amount of a scholarship based in part upon the data representative of at least one scholarship amount requested. In another embodiment, the status of the at least one scholarship request is reported to the requester by email. In yet another embodiment of a system for processing scholarship requests, the status of the at least one scholarship request is reported to the requester within the system, and wherein said status is available to the requester upon access to the system by the requester. In still another embodiment, the status reported to the requester comprises data representative of at least one from the group consisting of approved, denied, and pending.

In yet another embodiment of a system for processing scholarship requests, the processor is operable to compare data representative of at least one scholarship request to the data representative of at least one scholarship requirement to determine if a scholarship request related to the data representative of at least one scholarship request should be approved or denied. In even another embodiment, the processor is further operable to compare data representative of at least one scholarship request to data representative of at least one scholarship requirement to determine if a scholarship request related to the data representative of at least one scholarship request is accurate and/or complete.

In an embodiment of a system for processing scholarship requests, the system further comprises a program stored upon the storage medium, said program operable by the processor upon the data representative of at least one scholarship request. In another embodiment, the system is operably connected to at least one administrator computer and at least one requester computer through a network. In even another embodiment, the system is coupled within the administrator computer. In still another embodiment of a system for processing scholarship requests, the network comprises the Internet.

In an embodiment of a system for processing scholarship requests, the system comprises a processor and a storage medium operably connected to the processor, the storage medium capable of receiving and storing data representative of at least one scholarship request and data representative of at least one scholarship requirement, wherein the data representative of at least one scholarship request comprises data representative of at least one training session, and wherein a determination if a scholarship request related to the data representative of at least one scholarship request should be approved or denied based upon at least one approval process, the at least one approval process performed by an administrator or performed by the processor based upon data representative of at least one scholarship request and data representative of at least one scholarship requirement, and wherein the processor is operable to report a status of scholarship request to a requester.

In an embodiment of a system for managing training sessions by a training session manager, the system comprises a processor and a storage medium operably connected to the processor, the storage medium capable of receiving and storing data representative of at least one training event, wherein the data representative of at least one training event comprises a plurality of parameters identifying a training event, and wherein the processor is operable to receive input from a training session manager to modify and/or delete data representative of at least one training event, the training session manager affiliated with at least one training event, and wherein the processor is operable to report the modified data to a user of the system. In another embodiment, the plurality of parameters identifying a training event comprises a date(s) of the at least one training event. In yet another embodiment, the plurality of parameters identifying a training event comprises a location(s) of the at least one training event.

In an embodiment of a system for managing training sessions by a training session manager, the modified data is reported to the user by email. In another embodiment, the modified data is reported to the user within the system, and wherein said modified data is available to the user upon access to the system by the user.

In an embodiment of a system for managing training sessions by a training session manager, the system further comprises a storage medium operably connected to the processor, the storage medium capable of storing data representative of at least one training event.

In another embodiment, the system further comprises a program stored upon the storage medium, said program operable by the processor upon the data representative of at least one training event. In even another embodiment, the system is operably connected to at least one administrator computer and at least one training participant computer through a network. In yet another embodiment of a system for managing training sessions by a training session manager, the system is coupled within the administrator computer. In still another embodiment, the network comprises the Internet.

In an embodiment of a professional development registry system, the system comprises a processor, a storage medium operably connected to the processor, the storage medium capable of receiving and storing data representative of a first career ladder, data representative of at least one participant, data representative of at least one scholarship request, and data representative of at least one training event, and wherein the processor is operable to process said data and generate at least one report comprising at least part of said data. In another embodiment, the data representative of a first career ladder comprises data representative of a plurality of levels, each of the data representative of a plurality of levels comprising data representative of at least one requirement. In yet another embodiment, the data representative of at least one participant comprises data representative of at least one participant attribute.

In another embodiment of a professional development registry system, the processor is operable to compare the data representative of at least one participant to the data representative of a first career ladder to determine if data representative of at least one participant attribute satisfies any or all of the data representative of at least one requirement. In yet another embodiment, the data representative of at least one requirement comprises data representative of a requirement for advancement of at least one participant in accordance with the data representative of a first career ladder. In even another embodiment, the data representative of at least one requirement comprises data representative of at least one parameter.

In an embodiment of a professional development registry system, the system further comprises data representative of a second career ladder, wherein said data is capable of being stored in and retrieved from the storage medium, wherein said data comprises data representative of a plurality of levels and wherein the data representative of a plurality of levels comprises data representative of at least one requirement, and wherein the processor is further operable to compare the data representative of at least one participant to the data representative of a second career ladder to determine if data representative of at least one participant attribute satisfies any or all of the data representative of at least one requirement of the data representative of a plurality of levels of the data representative of a second career ladder.

In another embodiment of a professional development registry system, the system further comprises a program stored upon the storage medium, said program operable by the processor upon the data representative of at least one career ladder. In yet another embodiment, the storage medium is further capable of receiving and storing data representative of at least one scholarship requirement. In even another embodiment, the data representative of at least one scholarship request comprises data representative of at least one training session, data representative of at least one scholarship requester, and data representative of a confirmation that any term(s) and condition(s) applicable to the scholarship request has/have been accepted by the requester.

In an embodiment of a professional development registry system, a determination if a scholarship request related to the data representative of at least one scholarship request should be approved or denied based upon at least one approval process, the at least one approval process performed by an administrator or performed by the processor based upon data representative of at least one scholarship request and data representative of at least one scholarship requirement. In another embodiment, the data representative of at least one scholarship request further comprises data representative of at least one scholarship amount requested, and wherein the processor is further operable to compare data representative of at least one scholarship request to the data representative of at least one scholarship requirement to determine an amount of a scholarship based in part upon the data representative of at least one scholarship amount requested. In yet another embodiment, the data representative of at least one scholarship request further comprises data representative of a confirmation that any term(s) and condition(s) applicable to a scholarship request has/have been accepted by a requester. In even another embodiment, the at least one approval process is performed by an administrator or is performed by the processor based upon data representative of at least one scholarship request and data representative of at least one scholarship requirement.

In another embodiment of a professional development registry system, the processor is further operable to compare data representative of at least one scholarship request to data representative of at least one scholarship requirement to determine if a scholarship request related to the data representative of at least one scholarship request is accurate and/or complete.

In another embodiment, the data representative of at least one training event comprises a plurality of parameters identifying a training event. In yet another embodiment, the processor is operable to receive input from a training session manager to modify and/or delete data representative of at least one training event, the training session manager affiliated with at least one training event.

In another embodiment of a professional development registry system, the system further comprises a storage medium operably connected to the processor, the storage medium capable of storing said data. In yet another embodiment, the system further comprises a program stored upon the storage medium, said program operable by the processor upon said data. In even another embodiment, the system is operably connected to at least one administrator computer and at least one participant computer through a network. In another embodiment, the system is coupled within the administrator computer. In yet another embodiment, the network comprises the Internet.

In an embodiment of a computer program having a plurality of program steps to be executed on a first computer having a processor and a storage medium to manage the professional development of a participant, the computer program is operable by the processor to facilitate communication between the first computer and one or more user computers, and the computer program is operable to identify and process data representative of a career ladder, identify and process data representative of at least one participant, and communicate processed data representative of a career ladder level to at least one participant.

In an embodiment of a computer program having a plurality of program steps to be executed on a first computer having a processor and a storage medium to manage the professional development of a participant, the computer program is operable by the processor to facilitate communication between the first computer and one or more user computers, and the computer program is operable to identify and process data representative of at least one scholarship request, identify and process data representative of at least one participant, and communicate processed data representative of at least one scholarship request to at least one participant.

In an embodiment of a computer program having a plurality of program steps to be executed on a first computer having a processor and a storage medium to manage the professional development of a participant, the computer program is operable by the processor to facilitate communication between the first computer and one or more user computers, and the computer program is operable to identify and process data representative of at least one training event, identify and process data representative of at least one participant, and communicate processed data representative of at least one training event to at least one participant.

BRIEF DESCRIPTION OF THE DRAWINGS

The features and advantages of the system of the present application, and the manner of attaining them, will be more apparent and better understood by reference to the following descriptions taken in conjunction with the accompanying drawings, wherein:

FIG. 3 shows an excerpt of a screen printout of an embodiment of a registration screen of a professional development registry system of the present application;

DETAILED DESCRIPTION

The system of the present application is directed to registries, and more particularly to a professional development registry system. For the purposes of promoting an understanding of the principles of the present application, reference will now be made to the embodiments illustrated in the figures, and specific language will be used to describe the same. It will nevertheless be understood that no limitation of the scope of this disclosure is thereby intended.

Figure 1A:
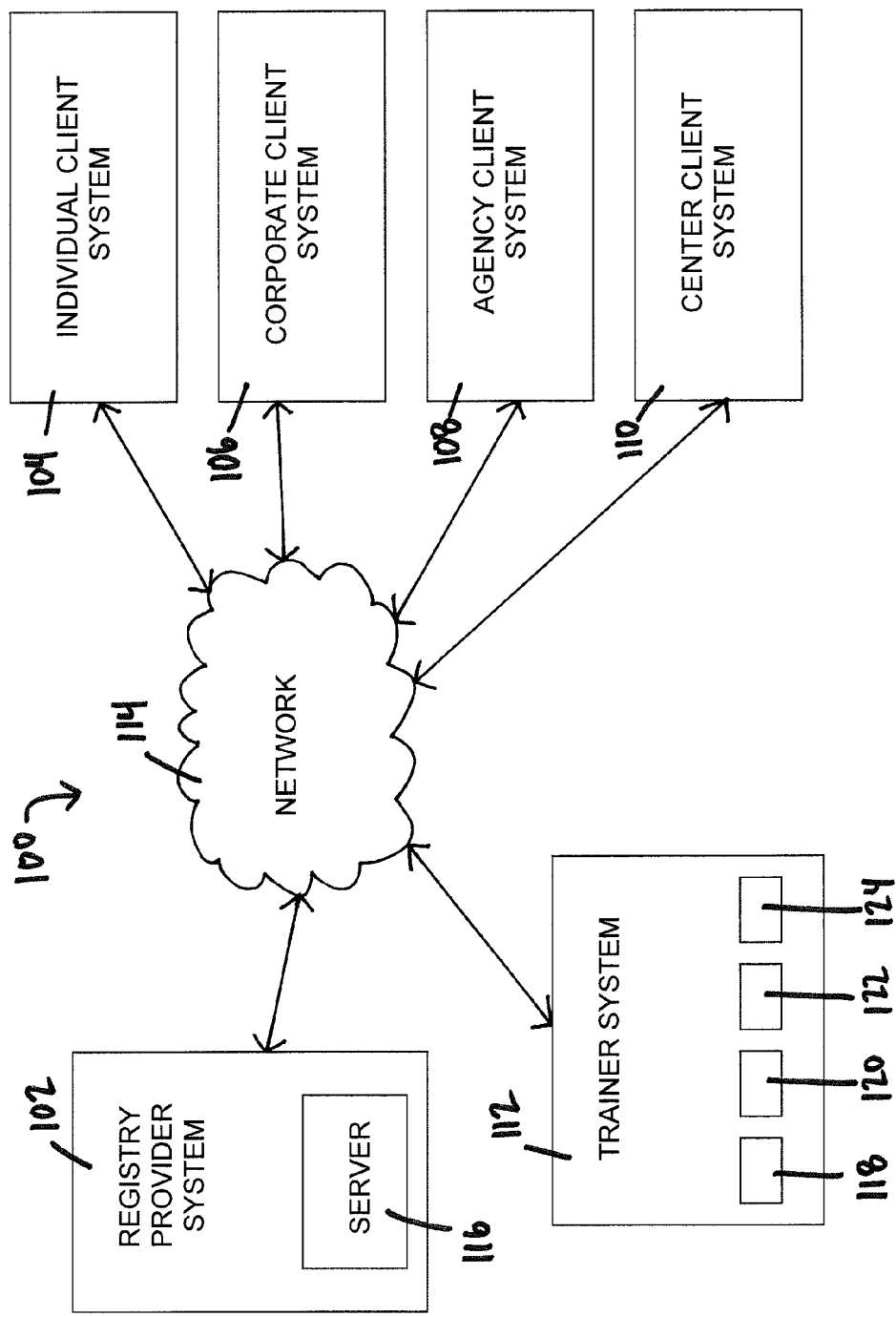
FIG. 1A shows a diagrammatic view of an embodiment of a professional development registry system of the present application.

Referring now to FIG. 1A, there is shown a diagrammatic view of an embodiment of professional development registry system 100 of the present disclosure. In the embodiment shown in FIG. 1A, professional development registry system 100 comprises registry provider system 102, individual client system 104, corporate client system 106, agency client system 108, center client system 110, trainer system 112, and network 114. Individual client system 104, corporate client system 106, agency client system 108, center client system 110, and trainer system 112, as well as registry/staff administrator system 126 and administrator/super administrator system 128 (as referenced herein regarding FIG. 1B) may be referred to herein individually as a "user system" and collectively as "user systems". An individual, corporation, agency, center, trainer, registry/staff administrator and/or administrator/super administrator using one or more of the "user systems" may be referred to herein individually as a "user" and collectively as "users".

Registry provider system 102 generally belongs to a party (service provider) offering a service to manage professional development registry information, or to a third-party who manages such a registry on behalf of a party interested in such registry information. Registry provider system 102 operates to manage such professional development registry information by providing a platform for users to access through network 114.

Individual client system 104 may be used by an individual to access registry provider system 102 over network 114. Registry provider system 102 is in bidirectional communication with individual client system 104 over network 114, and operates to provide an individual access to the information contained within registry provider system 102. Registry provider system 102 operates to allow an individual such access to review, modify, and otherwise manage his or her professional development information by providing a portal for the individual to access using individual client system 104 over network 114. By way of example to be discussed in further detail herein, an individual may provide data representative of the individual to registry provider system 102, such data being representative of at least one participant attribute, and registry provider system 102 may compare that data to data representative of one or more career ladders to determine if the data representative of at least one participant attribute satisfies any or all of the data representative of at least one requirement present within data representative of a career ladder.

Similarly, corporate client system 106 may be used by a corporation (by way of a corporate representative) to access registry provider system 102 over network 114 to manage professional development information pertaining to the corporation and/or employees or others affiliated with the corporation. Bidirectional communication between registry provider system 102 and corporate client system 106 over network 114 allows registry provider system 102 to provide access to the information contained within registry provider system 102 to corporate client system 106. By way of example to be discussed in further detail herein, a corporate representative may be interested to learn whether or not one of its employees obtained a training scholarship, whereby data representative of a scholarship request would be compared to data representative of a scholarship requirement within registry provider system 102 to determine if a scholarship request should be approved or denied based upon an approval process.

In a similar fashion as individual client system 104 and corporate client system 106 referenced above, agency client system 108, center client system 110, and trainer system 112 may be used by agencies, centers, and trainers, respectively, to access registry provider system 102 over network 114.

Agency client system 108 operates to allow an agency representative to access registry provider system 102 over network 114 to review, modify, and otherwise manage agency-specific information within registry provider system 102. Center client system 110 operates in a similar fashion to allow a center representative to access similar information for the center within registry provider system 102. Trainer system 112 may be used by a trainer in a similar fashion, allowing the trainer to add, delete, edit, review, and otherwise manage training information within registry provider system 102.

As shown in FIG. 1A, registry provider system 102 comprises server 116. Server 116 operates to allow registry provider system 102 to connect to network 114, and further operates to manage the registry of professional development information over network 114. Server 116 may also comprise software, hardware, and componentry such as, for example, microprocessors, input/output devices, and device controllers as known in the art.

Figure 1B:
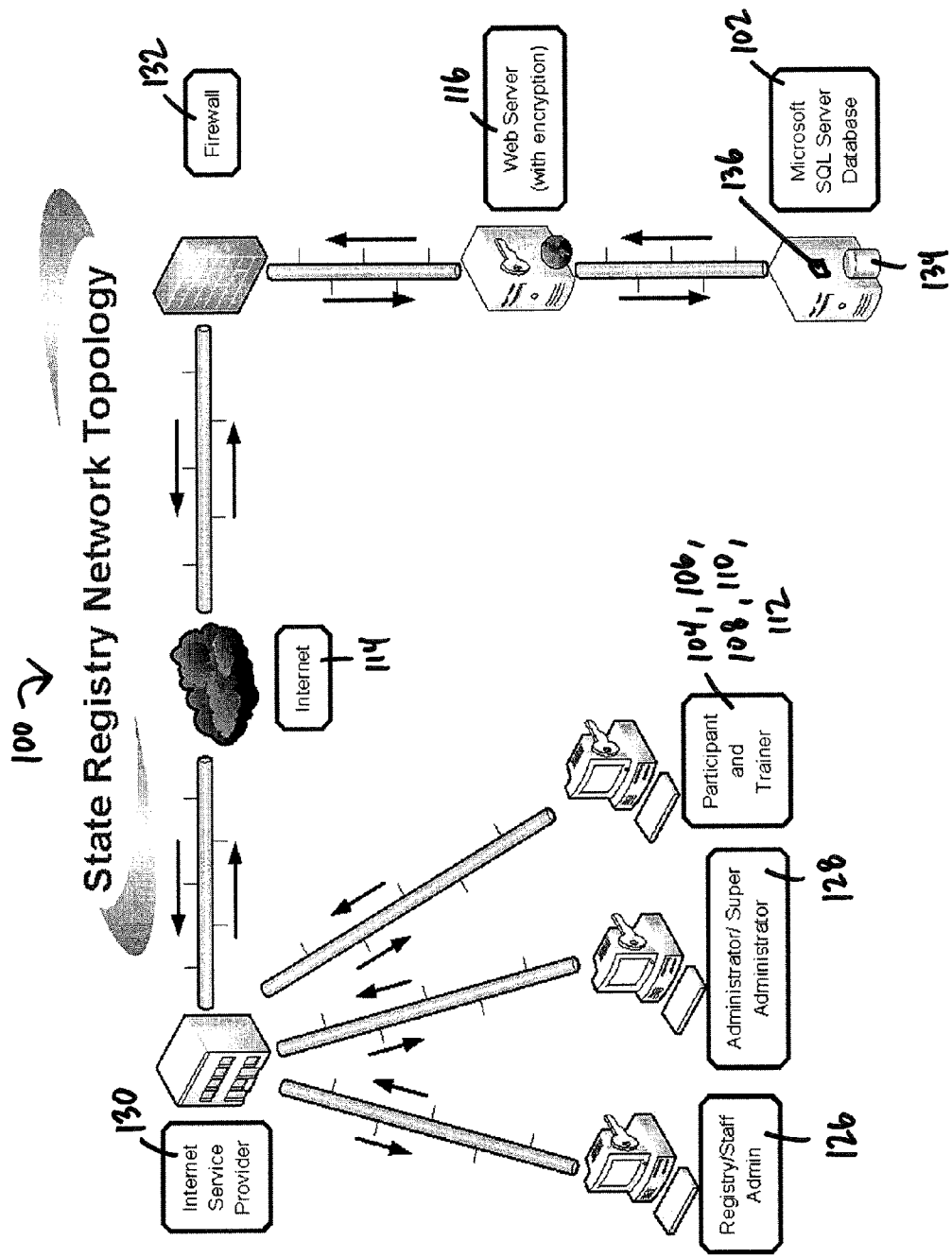
FIG. 1B shows a diagrammatic view of another embodiment of a professional development registry system of the present application.

Referring now to FIG. 1B, an exemplary embodiment of professional development registry system 100 of the present disclosure is shown. As shown in FIG. 1B, user systems (represented as "Participant and Trainer" on FIG. 1B, which is indicative of one or more of individual client system 104, corporate client system 106, agency client system 108, center client system 110, and trainer system 112), registry/staff administrator system 126, and administrator/super administrator system 128 are in bidirectional communication with Internet (network 114) via Internet service provider 130.

Registry/staff administrator system 126 and administrator/super administrator system 128 may be utilized by registry/staff administrators and administrators/super administrators, respectively, generally to manage information present within registry provider system 102. It can be appreciated that registry/staff administrators and administrators/super administrators may have related but differing "levels" of administrative access to registry provider system 102. For example, a registry/staff administrator may use registry/staff administrator system 126 to view and print one or more reports from registry provider system 102, while an administrators/super administrator may use administrator/super administrator system 128 to edit professional registry data within registry provider system 102. A registry/staff administrator and/or an administrator/super administrator may use registry/staff administrator system 126 and administrator/super administrator system 128, to "verify" a user, i.e. to confirm that a particular user is affiliated with and/or employed by a corporation, agency, center, etc., and should therefore have access to professional development registry system 100. Registry provider system 102 may be coupled within registry/staff administrator system 126 and/or administrator/super administrator system 128 and operate as provided herein.

Internet service provider 130 facilitates the bidirectional communication between the user systems and network 114 (shown as the Internet in FIG. 1B), providing host and/or gateway functions to the Internet. An Internet service provider 130 may be a commercial service provider, a university, a governmental entity, or a private corporation.

Bidirectional communication may also occur, as shown in FIG. 1B, between one or more user systems and registry provider system 102 over network 114. A firewall 132 may optionally be present between network 114 and registry provider system 102. Firewall 132 is a system or group of systems that enforce a security policy between an organization's internal network and a public network 114 such as the Internet. Firewall 132 determines which internal services and/or content may be accessed from a user on the other side of network 114, which users are permitted access to the internal services and/or content, and which user services and/or content may be accessed by the internal network. Firewall 132 operates to permit only authorized traffic to pass to or from the Internet, thus providing a perimeter form of defense for securing network access. Firewall 132 may be configured, for example, to allow specific internet protocol (IP) source addresses to access specific IP destination addresses, or only allow Hypertext Transfer Protocol (HTTP, a world wide web protocol) packets and not allow Telecommunication Network (TELNET) or File Transfer Protocol (FTP). Firewall 132 is preferably a packet filtering firewall but may also be a proxy (application) firewall.

Information from registry provider system 102 may transfer to and/or from one or more user systems via server 116. Server 116 may be a stand-alone server as shown in FIG. 1B, or may be a component of registry provider system 102 as shown in the embodiment of FIG. 1A. Server 116 need not be a single server, as server 116 may comprise a plurality of other servers or other computing devices or systems connected by hardware and software that collectively are operable to perform the functions allocated to server 116 according to the present disclosure. Server 116 may further comprise such software (operational and application), hardware, and componentry as would occur to one skilled in the art, for example, microprocessors, input/output devices, device controllers, video display means, and the like. Server 116 operates to transfer information from registry provider system 102 through network 114 to one or more user systems, and further operates to transfer information from one or more user systems to registry provider system 102. Databases known in the art, including, but not limited to, Microsoft SQL Server Database as shown in FIG. 1B, may comprise at least part of registry provider system 102.

Registry provider system 102 and/or one or more user systems may comprise one or more storage media 134. Any number of storage media 134 may be used with registry provider system 102 of the present disclosure, including, but not limited to, one or more of random access memory, read only memory, EPROMs, hard disk drives, floppy disk drives, optical disk drives, cartridge media, and smart cards, for example. As related to registry provider system 102, storage media 134 may operate by storing professional development registry data for access by registry provider system 102 and/or for storing computer instructions. In addition, storage media 134 is capable of receiving and storing data representative of any number of facets of professional development registry data/information as referenced herein. One or more user systems may also comprise storage media 134 operable to store professional development and other data as applicable to the particular user system.

Server 116 may further operate by "running" one or more software programs to control, in part or in whole, the functionality of processor 136 operably coupled to storage media 134. Processor 136 is operable to direct activity within registry provider system 102 based upon inputs to registry provider system 102 and requested outputs from registry provider system 102, and further operates to manage communication with one or more user systems over network 114. As previously stated, one or more computer programs may be stored upon storage media 134, and said programs may be operable by processor 136 upon data stored within registry provider system 102. Processor 136 is also operable to retrieve, store, and/or compare data provided by and/or representative of a user of registry provider system 102 to data stored within registry provider system 102.

Individuals may access registry provider system 102 over network 114 using individual client system 104 to review, modify (add, change, and/or delete), and otherwise manage his or her information included within registry provider system 102. In this fashion, an individual may keep track of his or her progress with respect to an applicable professional development program for which the individual may be a participant. For example, an individual (participant) may access a system for managing a career ladder to obtain information as to his or her career ladder level, to obtain requirements for advancement along a career ladder, and to generally manage his or her progress along a career ladder. An individual may also request one or more scholarships, and may access a system for processing scholarship requests to request scholarships and to obtain status information regarding said requests.

A corporation would have access to registry provider system 102 in a similar fashion as an individual would, but may also desire to access registry provider system 102 using corporate client system 106 in order to keep track of the progress of the professional development of one or more corporate employees. In addition, one or more corporate employees may access registry provider system 102 using corporate client system 106 in order to review, modify, and otherwise manage his or her professional development information as it may relate to the duties, professional accreditation, training requirements, etc., of the corporate employee at the corporation.

In a similar fashion, agencies and centers would also be able to access registry provider system 102 over network 114 using agency client system 108 and center client system 110, respectively. Agencies and centers may desire access to registry provider system 102 to ensure that any agency and/or center data, including, but not limited to, agency and/or center names, addresses, telephone and fax numbers, email address, Internet addresses, and contact person information, remains accurate and current within registry provider system 102. In addition, agencies and/or centers may access registry provider system 102 to review, edit, and otherwise manage the role the agencies and/or centers play with providing training services to one or more users of professional development registry system 100.

Trainer system 112 may be used by a training session manager in a similar fashion, allowing the training session manager to add, delete, edit, review, and otherwise manage training information within registry provider system 102. By way of example to be discussed in further detail herein, a training session manager may manage one or more training sessions using registry provider system 102, whereby processor 136 is operable to receive input from a training session manager to modify and/or delete data representative of at least one training event.

Regardless of the embodiment of professional development registry system 100 referenced herein and/or contemplated to be within the scope of the present disclosure, each user system may be of various configurations well known in the art. By way of example, trainer system 112 is shown in FIG. 1A as comprising processor 118, keyboard 120, monitor 122, and printer 124. Processor 118 operates to manage communication with registry provider system 102 over network 114, and further operates to manage input and output from keyboard 120, monitor 122, and printer 124. Keyboard 120 is an exemplary input device, operating as a means for a user to input information to trainer system 112. Monitor 122 operates as a visual display means to display the professional development registry information to a user using a user system. Printer 124 operates as a means to display professional development registry information. Other input and output devices, such as a keypad, a computer mouse, a fingerprint reader, a pointing device, a microphone, and one or more loudspeakers are contemplated to be within the scope of the present disclosure. It can be appreciated that processor 118, keyboard 120, monitor 122, printer 124 and other input and output devices referenced herein may be components of one or more user systems and the registry provider system 102 of the present disclosure.

Each user system may comprise other devices as known in the art for bidirectional communication over network 114. For example, personal computers, mainframe computers, workstations, notebook computers, laptop computers, handheld computers, personal digital assistants (PDAs), telephonic devices (including smartphones and wireless mobile telephones), and the like, are contemplated to be within the scope of the present disclosure.

Network 114, according to the present disclosure, is of the type to permit bidirectional communication between registry provider system 102 and one or more user systems. In at least one embodiment, network 114 comprises the global network known as the Internet. Network 114 may, however, comprise other network means permitting bidirectional communication, or combinations of such network means as are well known in the art. While the embodiments referenced herein may be implemented using the Internet as network 114, it is to be understood that other embodiments of the present disclosure could be implemented on other types of environments known to those skilled in the relevant art, including, but not limited to, one or more local area networks, one or more wide area networks, one or more peer-to-peer networks, telecommunications wire and/or fiber networks, satellite communications networks, one or more wireless communications networks, stand-alone systems, coaxial cable, fiber optic cable, twisted-pair cable, the equivalents of any of the foregoing, or the combination of any two or more of the foregoing. The present disclosure may be implemented utilizing any combination of two or more components that are able to communicate through any type of communications link known to those skilled in the art, and such alternate network means are contemplated to be within the scope of the present disclosure.

Figure 2:
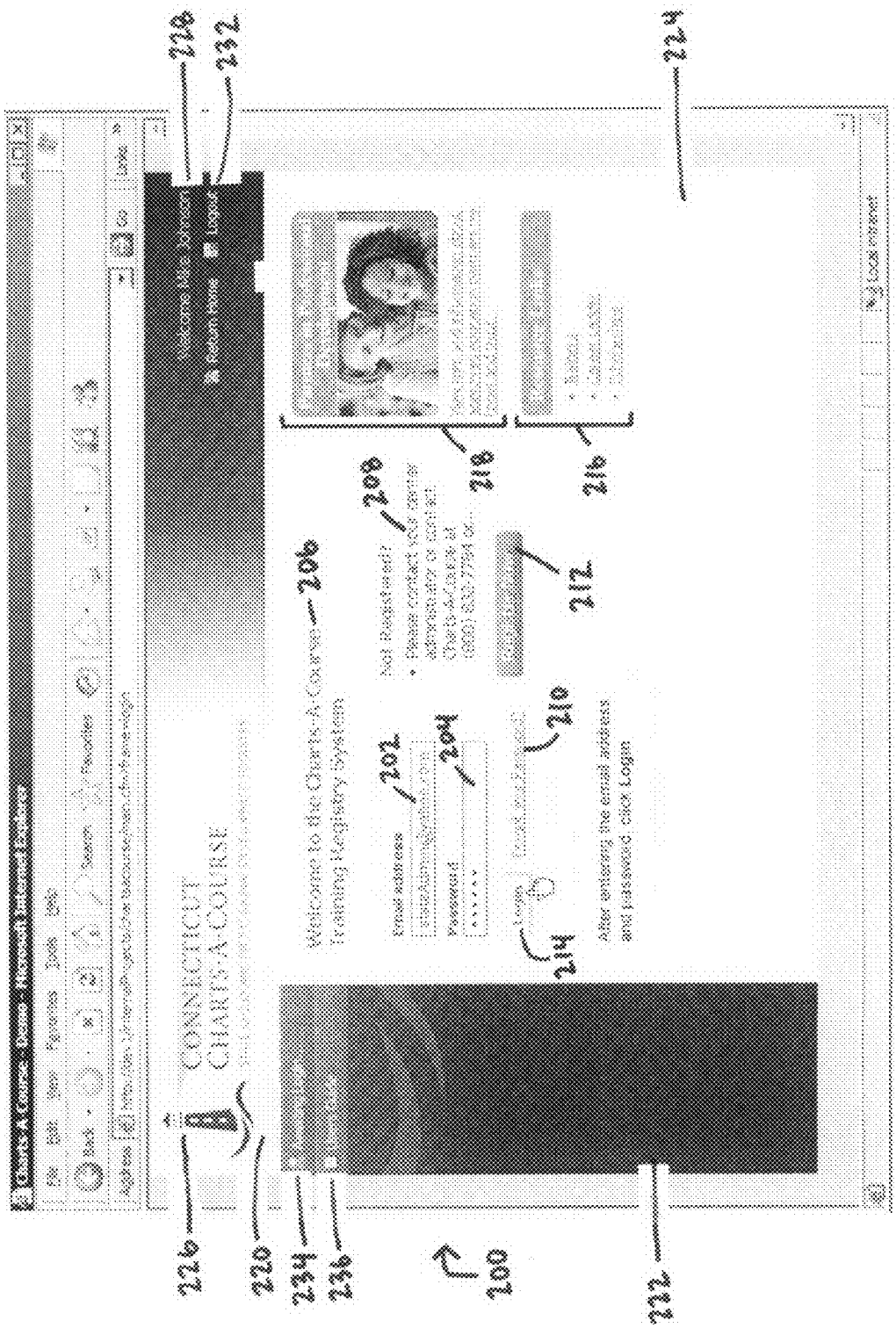
FIG. 2 shows a screen printout of an embodiment of a login screen of a professional development registry system of the present application.

Referring now to FIG. 2, a screen printout of an embodiment of login screen 200 according to one embodiment of professional development registry system 100 is shown. In this embodiment, login screen 200 is located on an intranet, but may also be available over the Internet, along with one or more of the other screens referenced herein. Login screen 200 provides input fields for a user identification (for example, an email address) and a password at email address field 202 and password field 204, respectively. Valid email addresses and passwords may be provided to a user by an administrator or some other party affiliated with professional development registry system 100, and the email addresses and corresponding passwords must be recognizable by professional development registry system 100 in order to allow a user to access the functionality of professional development registry system 100.

Login screen 200 of FIG. 2 also comprises an optional welcome phrase 206 and optional system contact information 208 for the convenience of a user. Login screen 200 further comprises a "Forgot Your Password" hyperlink 210 for execution of a small program used to assist a user to remember his or her password, such a program as well known in the art. If a user of professional development registry system 100 is not yet registered, the user may select "Register Now" button 212 which, upon selection by the user, would forward the user to registration screen 300, an excerpt of an embodiment of such as shown in FIG. 3.

If a user is registered with professional development registry system 100, the user may select login button 214 to log into professional development registry system 100. Login button 214 may be selected by a user of professional development registry system 100 after the user has entered his/her assigned email address and password to permit the user to proceed with accessing other content of professional development registry system 100.

Login screen 200, and as optionally may be shown in one or more of the other screens as described herein, may further comprise one or more links, including resource links 216 and partner links 218, providing information for trainers, career ladders, and scholarships, as well as information on trusted education partners, respectively.

In addition to the foregoing, and as may optionally be present in one or more other screens as described herein, login screen 200 may comprise one or more frames, including header frame 220, sidebar frame 222, and content frame 224. Header frame 220, as shown on login screen 200, comprises system logo 226, and further comprises personalized welcome message 228, return home button 230, and logout button 232. Sidebar frame 222, as shown on FIG. 2, may comprise a screen status message 234 and one or more sidebar tabs 236, which, upon selection by a user, may direct the user to one or more additional screens or materials.

Referring now to FIG. 3, an excerpt of a screen printout of an embodiment of a registration screen 300 according to one embodiment of a professional development registry system 100 is shown. Registration screen 300 provides input fields for the entry of user identification information, including first name entry field 302, last name entry field 304, email address entry field 306, re-type email address entry field 308, desired password entry field 310, re-type desired password entry field 312, home address 1 entry field 314, home address 2 entry field 316, state selection field 318, city field 320, zip code entry field 322, home phone entry field(s) 324, and work phone entry fields 326, the use of which (entry of information by a user) as commonly known and understood. Once a user has entered his/her registration information, the user may select continue button 328 to proceed to the next logical screen of professional development registry system 100.

Figure 4:
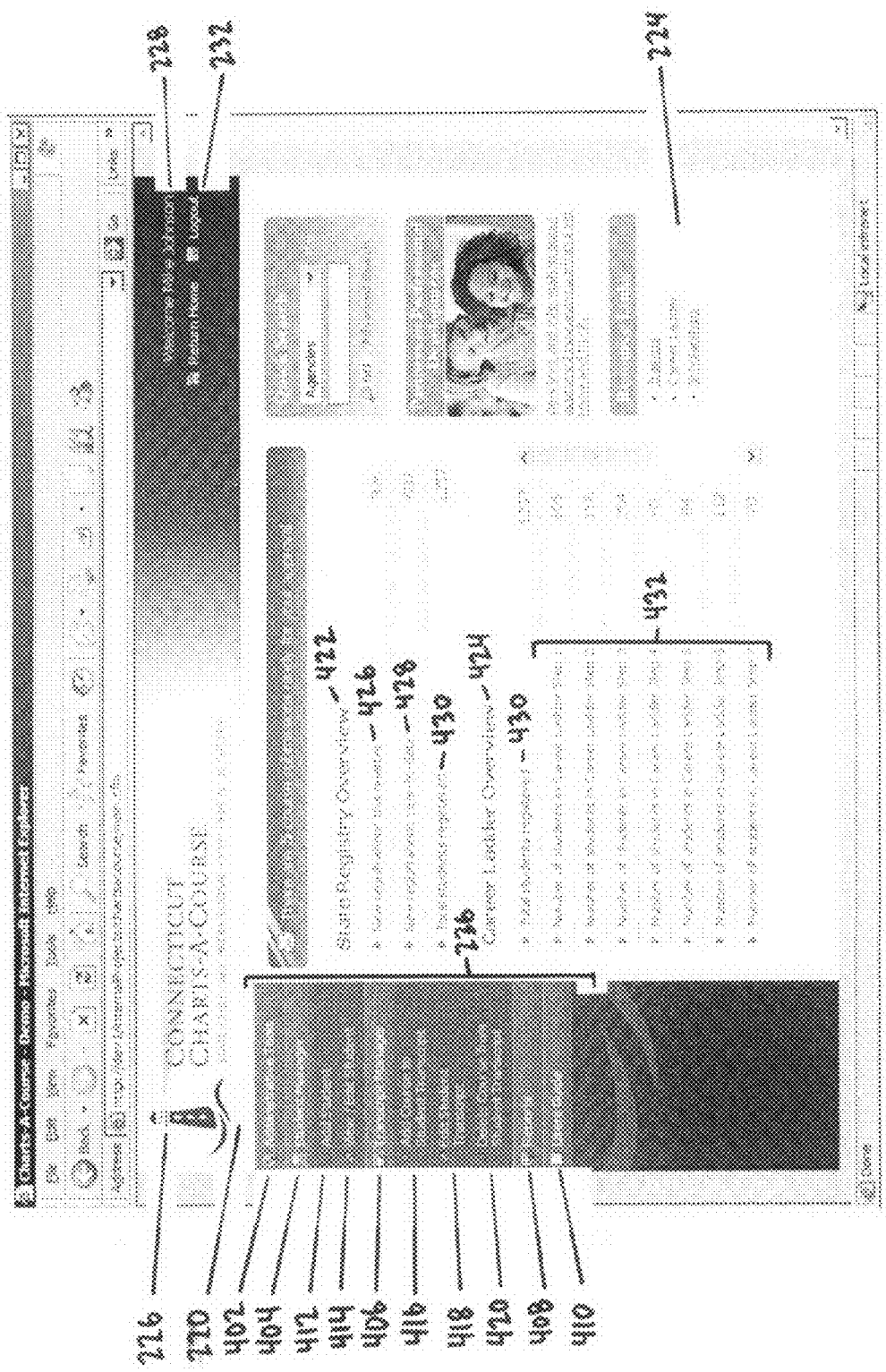
FIG. 4 shows a screen printout of an embodiment of an administrator main screen of a professional development registry system of the present application.

FIG. 4 shows a screen printout of an embodiment of administrator main screen 400 according to at least one embodiment of professional development registry system 100. In this embodiment, administrator main screen 400 is located on an intranet, but may also be available on the Internet in a similar fashion to one or more of the other screens disclosed herein.

The embodiment of administrator main screen 400 as shown in FIG. 4 is an example of the first screen an administrator would be presented with upon successful login as described in FIG. 3. The embodiment of administrator main screen 400 shown in FIG. 4 comprises frames similar to those of an embodiment of registration screen 300, including header frame 220, sidebar frame 222, and content frame 224. Header frame 220 may comprise system logo 226, personalized welcome message 228, return home button 230, and logout button 232. Sidebar frame 222, as shown in FIG. 4, may comprise one or more sidebar tabs 236.

In this particular embodiment, sidebar tabs 236 comprise administrative tools tab 402, student manager tab 404, transcript manager tab 406, reports tab 408, and users guide tab 410. The selection of administrative tools tab 402 would transfer an administrator to a screen allowing the administrator to, in part, add, modify, and/or delete administrator accounts, an exemplary screen shown in FIG. 5A.

The selection of student manager tab 404 would transfer an administrator to a screen allowing the administrator to add, view, and edit student information. Prior to advancing to such a screen, an administrator may decide to select add student button 412 or view/edit student button 414, allowing the administrator to subsequently add student information or view and/or edit student information, respectively.

The selection of transcript manager tab 406 would transfer an administrator to a screen allowing the administrator to add, edit, and delete student transcript information. Prior to advancing to such a screen, an administrator may decide to select add course to student transcript button 416, edit student transcript button 418, or delete course from student transcript button 420, allowing the administrator to subsequently add a course to a student transcript, edit a student transcript, or delete a course from a student transcript, respectively.

In the content frame 224, information pertaining to a state registry overview 422 and a career ladder overview 424 may be provided. State registry overview 422 may provide an administrator information regarding new registrations this quarter 426, information regarding new registrations year-to-date 428, and information regarding total students registered 430. Information pertaining to a career ladder overview 424 may include information regarding total students registered 430 and information regarding the number of students in one or more career ladders 432.

Figure 5A:
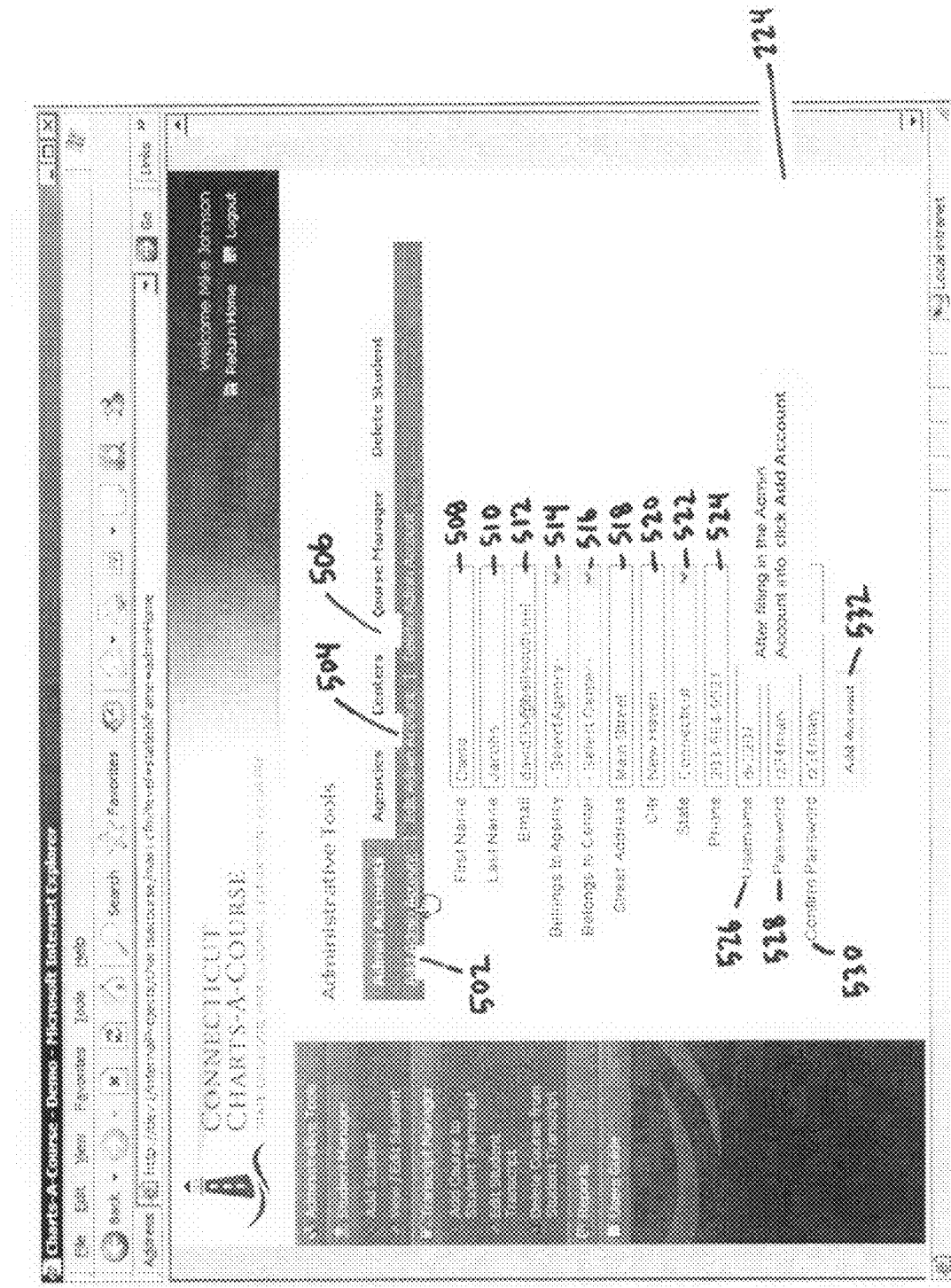
FIG. 5A shows a screen printout of an embodiment of an administrative tools accounts screen of a professional development registry system of the present application.

Referring now to FIG. 5A, a screen printout of an embodiment of administrative tools accounts screen 500 according to one embodiment of professional development registry system 100 is shown. In this embodiment, administrative tools accounts screen 500 may comprise one or more elements of the foregoing screens, and may further comprise content specific to administrative tools accounts screen 500 within content frame 224.

Administrative tools accounts screen 500 may comprise add administrative account tab 502, edit administrative account tab 504, and delete administrative account tab 506. An administrator may be able to add, edit, and/or delete (as appropriate) information pertaining to an administrator, including administrator first name entry field 508, administrator last name entry field 510, administrator email address entry field 512, administrator belongs to agency selection field 514, administrator belongs to center selection field 516, administrator street address entry field 518, administrator city field 520, administrator state selection field 522, administrator phone entry field 524, administrator username field 526, administrator password field 528, and administrator confirm password field 530 upon selection of the appropriate add administrative account tab 502, edit administrative account tab 504, and delete administrative account tab 506, the use of which (entry of information by an administrator) as commonly known and understood. Once an administrator has entered and/or selected all information, the administrator may select add account button 532 to add the new account to professional development registry system 100. Edit account button (not shown) and delete account button (also not shown) are anticipated to be within the scope of the present disclosure for edit administrative account tab 504 and delete administrative account tab 506, respectively.

It can be appreciated that in a similar fashion to an administrator's ability to add information pertaining to an administrator, a user may also register with professional development registry system 100 and request administrator/super administrator access. In such a scenario, a user may also be required to provide proof of administrative access eligibility, for example by mailing, faxing, or emailing documented proof of eligibility. A current administrator/super administrator may then review the user's request along with the provided proof of eligibility to determine whether or not to approve the user's request for administrative access. If approved, the administrator/super administrator may then determine the appropriate level of administrative access of the user to professional development registry system 100.

Figure 5B:
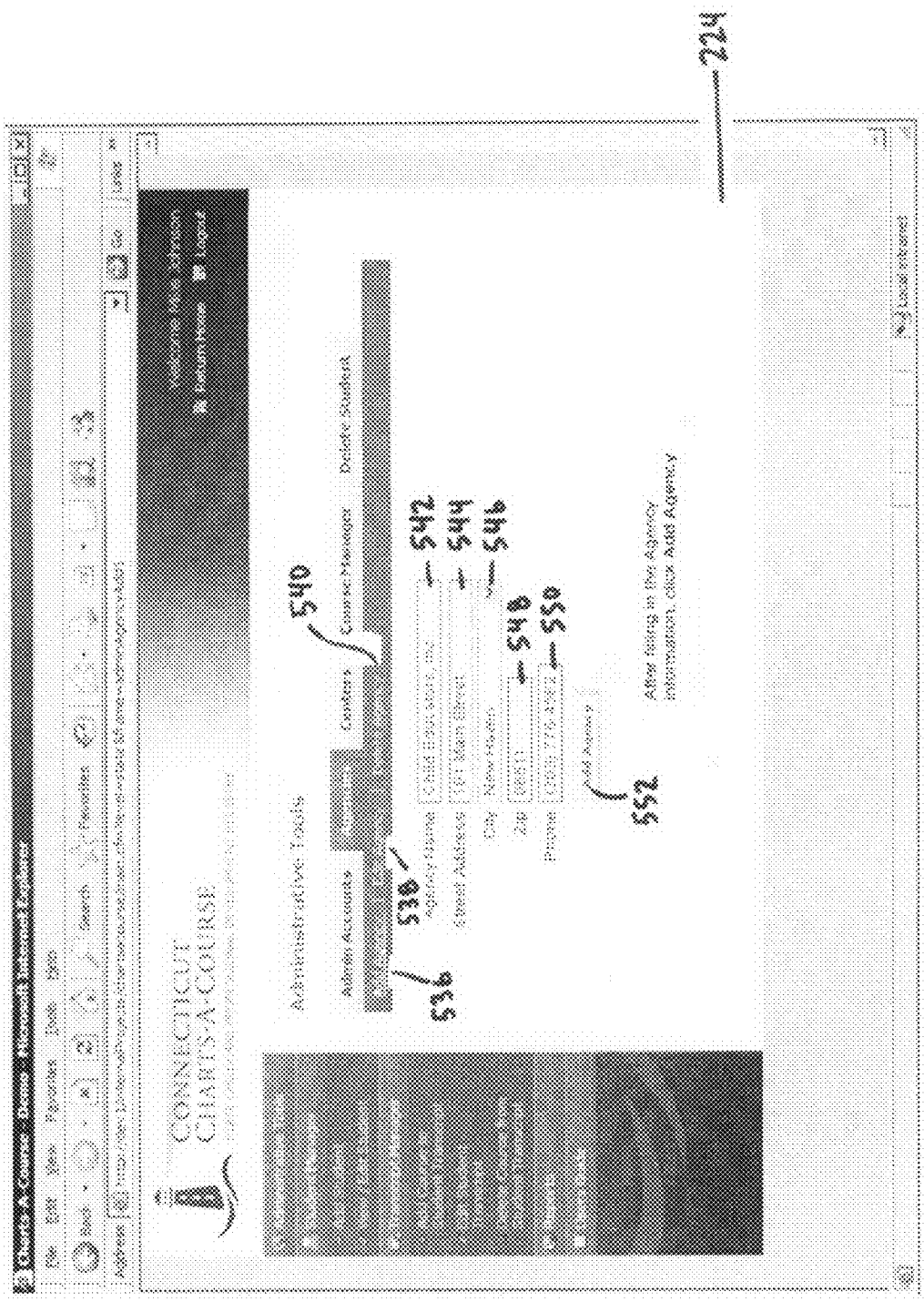
FIG. 5B shows a screen printout of an embodiment of an administrative tools agencies screen of a professional development registry system of the present application.

Referring now to FIG. 5B, a screen printout of an embodiment of administrative tools agencies screen 535 according to one embodiment of professional development registry system 100 is shown. In this embodiment, administrative tools agencies screen 535 may comprise one or more elements of the foregoing screens, and may further comprise content specific to administrative tools agencies screen 535 within content frame 224.

Administrative tools agencies screen 535 may comprise add agency tab 536, edit agency tab 538, and delete agency tab 540. An administrator may be able to add, edit, and/or delete (as appropriate) information pertaining to an agency, including agency name entry field 542, agency street address entry field 544, agency city field 546, agency zip code entry field 548, and agency phone entry field 550 upon selection of the appropriate add agency tab 536, edit agency tab 538, and delete agency tab 540. Once an administrator has entered and/or selected all information, the administrator may select add agency button 552 to add the new agency to professional development registry system 100. Edit agency button (not shown) and delete agency button (also not shown) are anticipated to be within the scope of the present disclosure for edit agency tab 538 and delete agency tab 540, respectively.

Figure 5C:
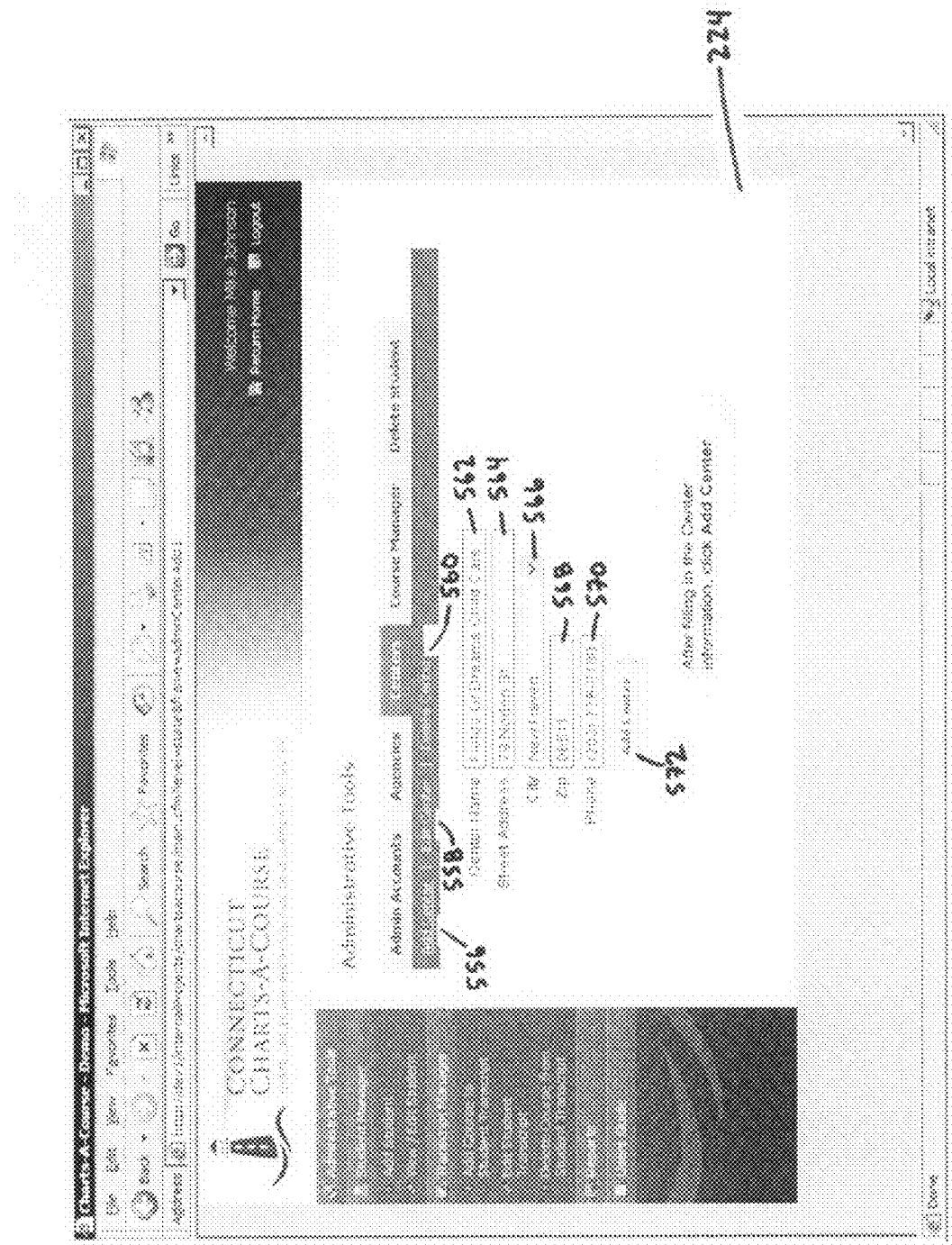
FIG. 5C shows a screen printout of an embodiment of an administrative tools centers screen of a professional development registry system of the present application.

Referring now to FIG. 5C, a screen printout of an embodiment of administrative tools centers screen 555 according to one embodiment of professional development registry system 100 is shown. In this embodiment, administrative tools centers screen 555 may comprise one or more elements of the foregoing screens, and may further comprise content specific to administrative tools centers screen 555 within content frame 224.

Administrative tools centers screen 555 may comprise add center tab 556, edit center tab 558, and delete center tab 560. An administrator may be able to add, edit, and/or delete (as appropriate) information pertaining to a center, including center name entry field 562, center street address entry field 564, center city field 566, center zip code entry field 568, and center phone entry field 570 upon selection of the appropriate add center tab 556, edit center tab 558, and delete center tab 560. Once an administrator has entered and/or selected all information, the administrator may select add center button 572 to add the new center to professional development registry system 100. Edit center button (not shown) and delete center button (also not shown) are anticipated to be within the scope of the present disclosure for edit center tab 558 and delete center tab 560, respectively.

Figure 5D:
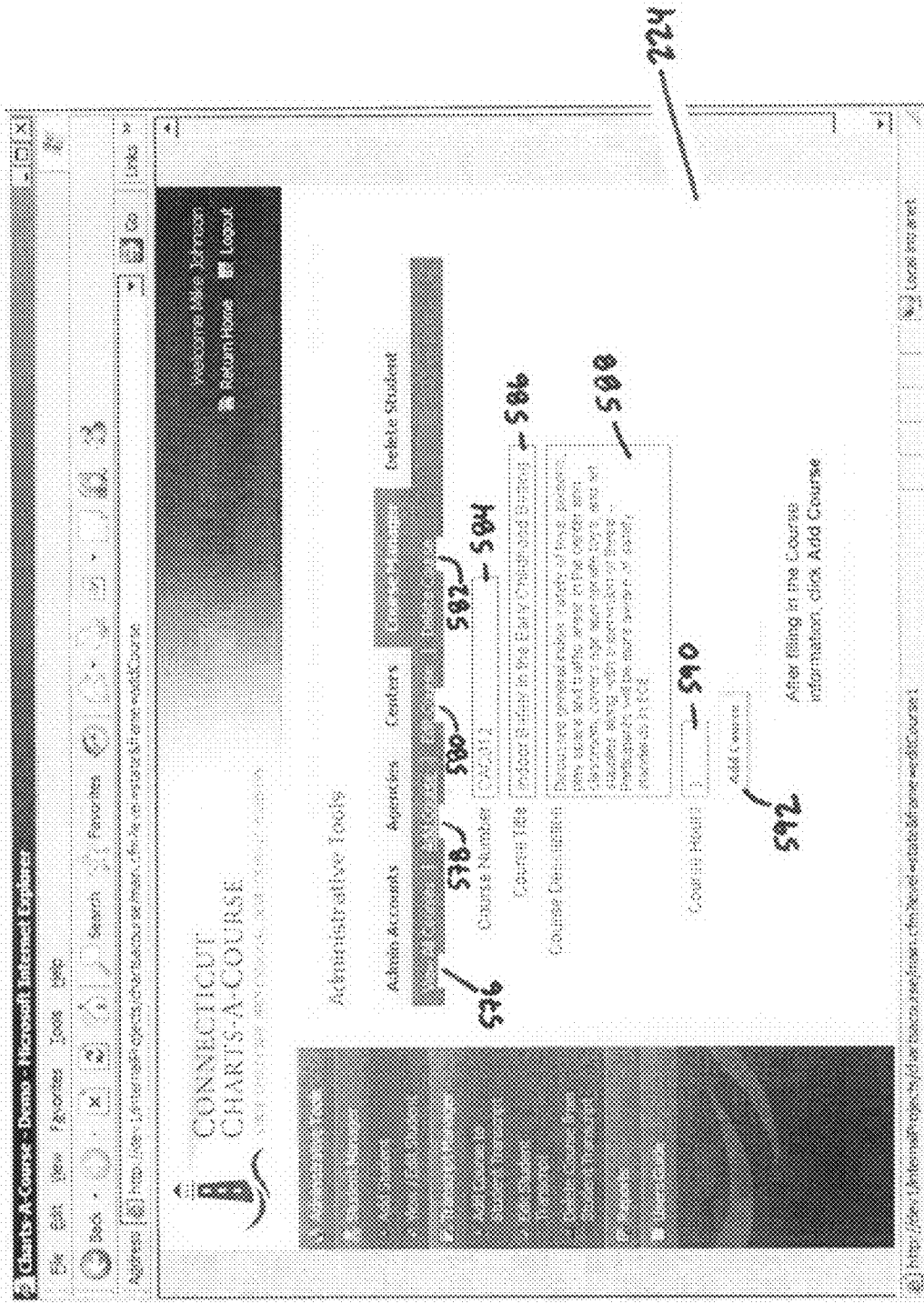
FIG. 5D shows a screen printout of an embodiment of a course manager screen of a professional development registry system of the present application.

Referring now to FIG. 5D, a screen printout of an embodiment of course manager screen 575 according to one embodiment of professional development registry system 100 is shown. In this embodiment, course manager screen 575 may comprise one or more elements of the foregoing screens, and may further comprise content specific to course manager screen 575 within content frame 224.

Course manager screen 575 may comprise view all courses tab 576, add course tab 578, edit course tab 580, and delete course tab 582. An administrator may be able to view all courses (fields not shown) upon selection of view all courses tab 576, and would be able to add, edit, and/or delete (as appropriate) information pertaining to a course, including course number field 584, course title field 586, course description field 588, and course hours field 590, upon selection of the appropriate add course tab 578, edit course tab 580, and delete course tab 582. Once an administrator has entered and/or selected all information, the administrator may select add course button 592 to add the new course to professional development registry system 100. Edit course button (not shown) and delete course button (also not shown) are anticipated to be within the scope of the present disclosure for edit course tab 580 and delete course tab 582, respectively.

Figure 5E:
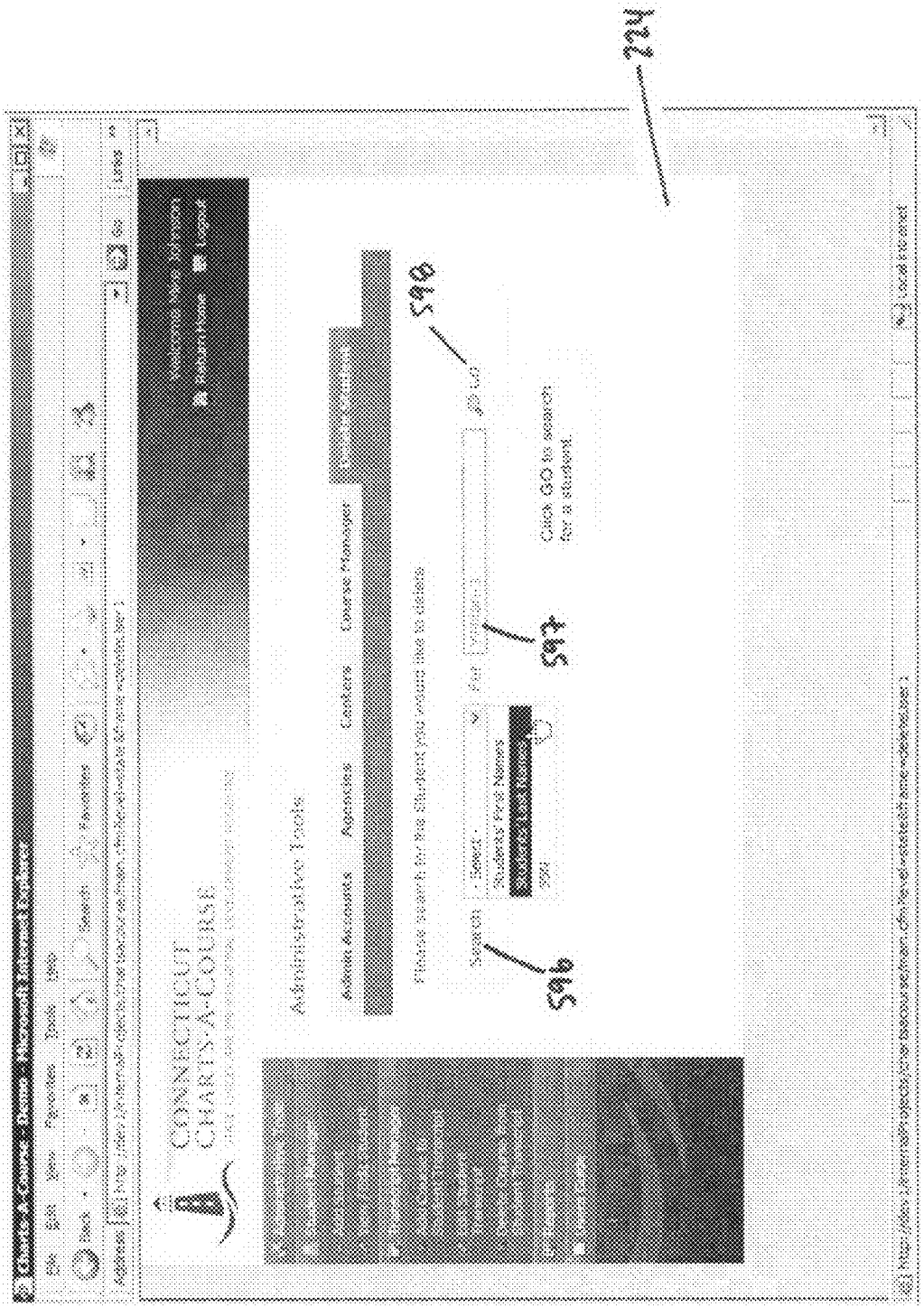
FIG. 5E shows a screen printout of an embodiment of a delete student screen of a professional development registry system of the present application.

Referring now to FIG. 5E, a screen printout of an embodiment of delete student screen 595 according to one embodiment of professional development registry system 100 is shown. In this embodiment, delete student screen 595 may comprise one or more elements of the foregoing screens, and may further comprise content specific to delete student screen 595 within content frame 224.

Delete student screen 595 may comprise search student selection field 596 and search query field 597. An administrator may search for a student from search student selection field 596 based on any number of available parameters, including, but not limited to, a student's first name, a student's last name, and a student's social security number (SSN) as shown in the embodiment of delete student screen 595 shown in FIG. 5E. Once an administrator has chosen the desired parameter of search student selection field 596 and entered information for a search in search query field 597, the administrator may select go button 598 to search for and subsequently delete a student from professional development registry system 100. It can be appreciated that one or more delete functions described herein, including, but not limited to, the ability for an administrator to delete a student from professional development registry system 100 may reside with a super administrator as described herein and not with any other user of administrator of a system. The ability for different types of users of professional development registry system 100 to perform specific functions, including, but not limited to, the ability to delete a user, is contemplated to be within the scope of the present disclosure.

Figure 6:
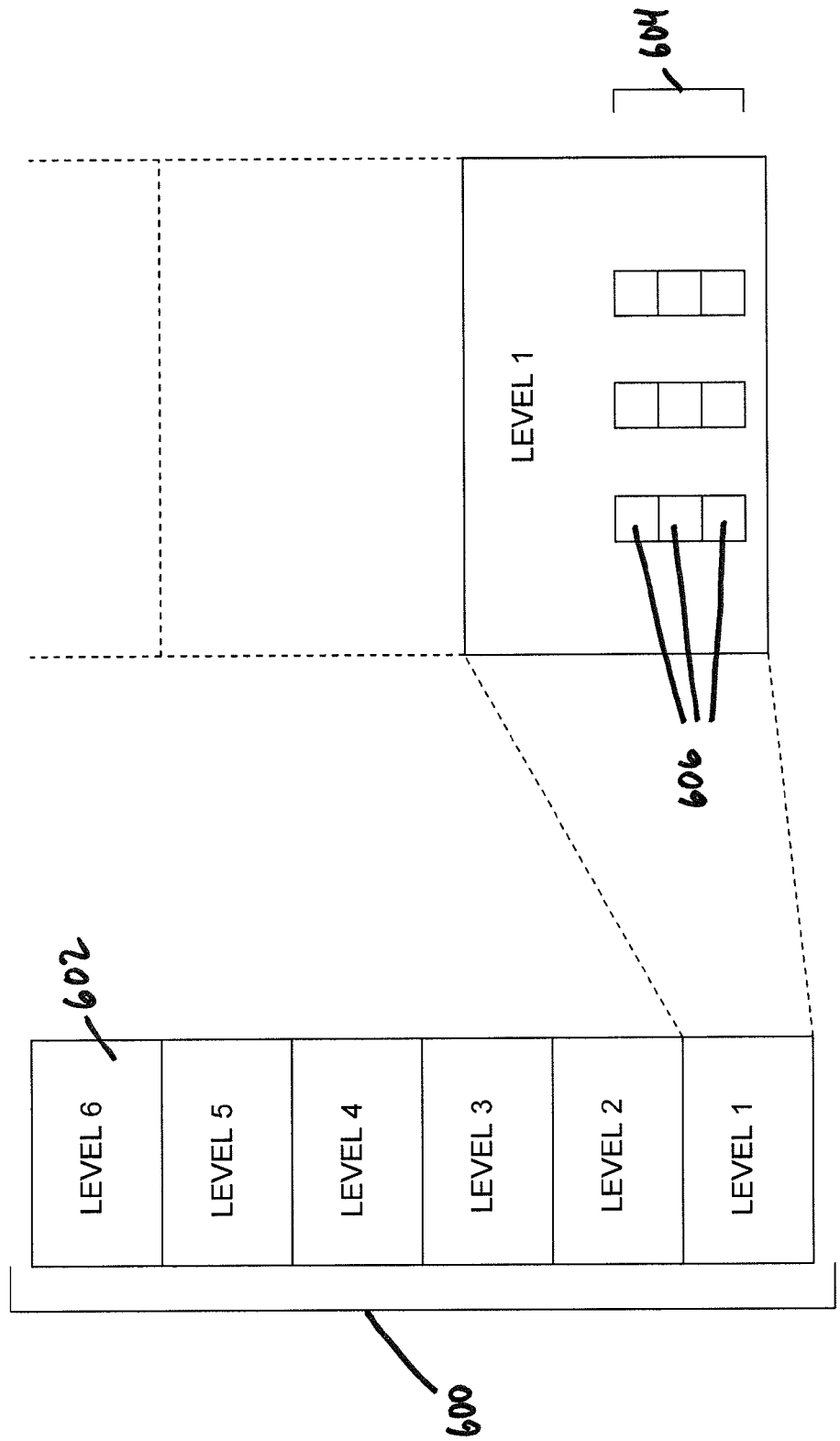
FIG. 6 shows a diagrammatic view of an embodiment of a career ladder and data represented therein of a professional development registry system of the present application.

Referring now to FIG. 6, there is shown a diagrammatic view of one embodiment of career ladder 600 and data represented therein. Career ladder 600 represents a framework for a user to identify data representative of a plurality of levels 602 present within career ladder 600. The exemplary career ladder 600 shown in FIG. 6 comprises six levels; however, it can be appreciated that a career ladder 600 may have at least two levels, as a one level career ladder would only effectively be indicative of a single requirement to be met.

Data representative of a plurality of levels 602 of career ladder 600 may comprise, but are not limited to, data representative of levels of personal or general criteria, education, levels of training, and number of hours of education and/or training. The terms "course", "training", "training session", and "training event" are used interchangeably herein, and are intended to be reflective of a training session, seminar, course, or other type of educational program as known in the art. Each of the data representative of a plurality of levels 602 may comprise data representative of at least one requirement 604. Data representative of at least one requirement 604 may comprise data that, when taken together, may constitute the requirements necessary for that particular level 602 of career ladder 600.

Data representative of at least one requirement 604 may comprise data representative of at least one parameter 606. For example, data representative of at least one parameter 606 may be related to professional development experience such as the completion of a course, ten hours of training, twenty hours of training, thirty hours of training, etc., and/or may comprise personal or general criteria that may be applicable to a particular profession or position, including factors such as age and/or the absence of or limited offenses in criminal or traffic matters.

By way of example, a participant may be associated with one particular career ladder 600, and the career ladder 600 may comprise data representative of a plurality of levels 602. The data representative of a plurality of levels 602 may comprise three separate levels, including, for example, Level 1, Level 2, and Level 3. Each of the data representative of a plurality of levels 602 in this example comprise data representative of at least one requirement 604, and the data representative of at least one requirement 604 may comprise data representative of at least one parameter 606, for example a high school degree or equivalent (to complete Level 1), ten hours of child care training (to complete Level 2), and fifty hours of child care training (to complete Level 3). Once a participant has achieved the highest level 602 of a career ladder 600, the participant has completed that particular career ladder 600 and may then be entitled to the "reward" for such an achievement, for example a completion certificate or degree, if applicable, to the completion of a particular career ladder 600.

Figure 7A:
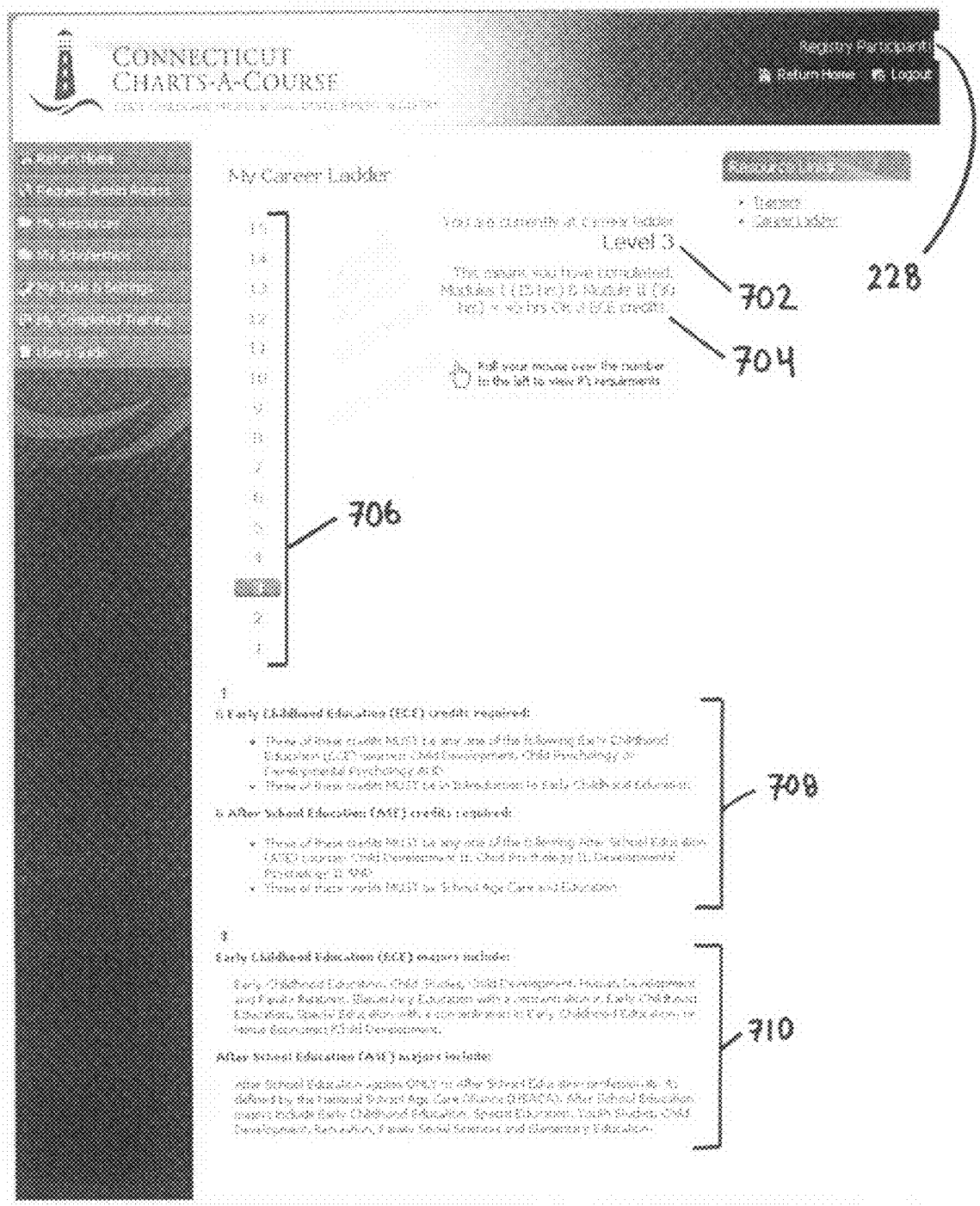
FIG. 7A shows a screen printout of an embodiment of a career ladder screen of a system for managing a career ladder of a participant of a professional development registry system of the present application.

FIG. 7A shows a screen printout of an embodiment of a career ladder screen 700 of a system for managing a career ladder of a participant according to an embodiment of professional development registry system 100. In the embodiment shown in FIG. 7A, career ladder screen 700 comprises a personalized welcome message 228 comprising data representative of at least one participant, which may include, but is not limited to, a username, an identification number, a first name, a last name, and an email address.

Career ladder screen 700 may also comprise a career level identifier 702 which may identify the participant's current level 602 within a career ladder 600. As shown in this embodiment, the career ladder 600 level 602 is Level 3 as indicated by career level identifier 702. Career ladder screen 700 may also include a career level summary 704, which may comprise one or more statements summarizing data representative of at least one participant attribute. As referenced herein, data representative of a participant attribute relates to one or more personal or general criteria that may be applicable to a particular profession or position include factors such as age and the absence of or limited offenses in criminal or traffic matters, for example, and/or one or more participant experience criteria such as the completion of a course, a number of hours of training, and/or the type of course credits previously earned by a participant. In the example shown in FIG. 7A, career level summary 704 comprises information pertaining to the completion of two modules (which may include, but are not limited to, one or more courses), the number of hours completed, and/or the number and type of course credits earned by the participant.

The career level identifier 702 and career level summary 704, as shown in FIG. 7A, may change in response to a participant's "mouse-over" of a particular level 602 in a career ladder number list 706. As shown in the example shown in FIG. 7A, career ladder number list 706 comprises fifteen levels, all of which pertain to a particular career ladder 600. It can be appreciated that career level identifier 702 and career level summary 704 may be indicative of a participant's current level 602 within career ladder 600, or career level identifier 702 and career level summary 704 may change as they appear on the career ladder screen 700 as a participant moves his or her computer mouse over a particular career ladder number on the career ladder number list 706.

Career ladder screen 700 may also comprise summaries of data representative of at least one requirement 604. For example, career ladder screen 700 may include one or more credit requirement summaries 708 and/or major requirement summaries 710. In the examples shown in FIG. 7A, credit requirement summary 708 comprises summaries of early childhood education (ECE) credit requirements and after school education (ASE) credit requirements. As also shown in FIG. 7A, major requirement summary 710 comprises summaries of early childhood education (ECE) major requirements and after school education (ASE) major requirements. It can be appreciated that credit requirement summary 708 and/or a major requirement summary 710 may comprise data representative of at least one requirement 604 for any number of types of professional development registry systems 100.

Figure 7B:
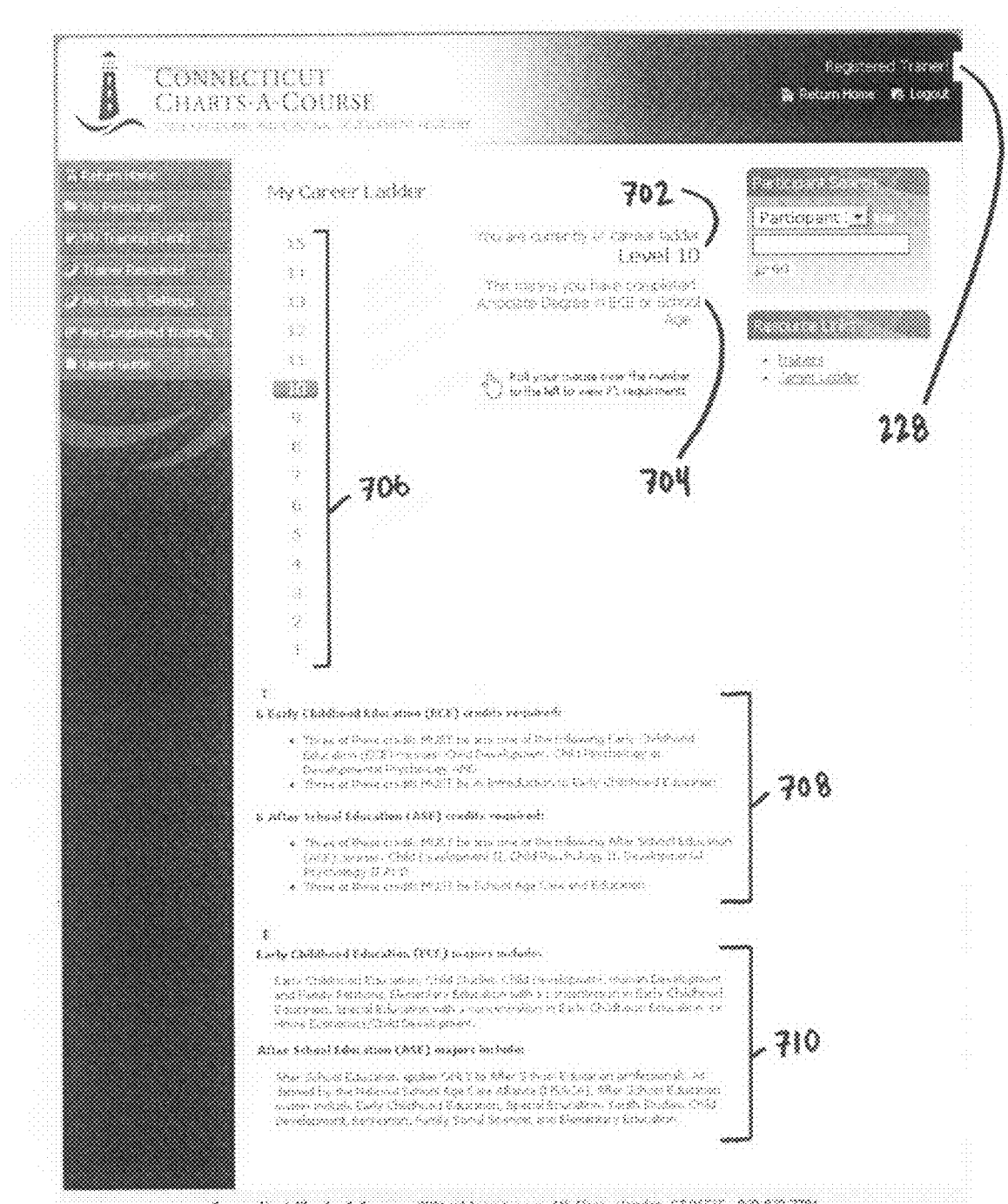
FIG. 7B shows a screen printout of another embodiment of a career ladder screen of a system for managing a career ladder of a participant of a professional development registry system of the present application.

A screen printout of an additional embodiment of career ladder screen 700 is shown in FIG. 7B. In this embodiment, career level identifier 702, career level summary 704, and career ladder number list 706 are presented as in the embodiment of FIG. 7A, but in this embodiment, career level identifier 702 is Level 10, and career level summary 704 shows the level 602 of professional development completed to attain Level 10. Career level "10" is also highlighted within career ladder number list 706 in this embodiment, indicative of a participant's "mouse-over" of level 10 on this example of career ladder screen 700.

Figure 7C:
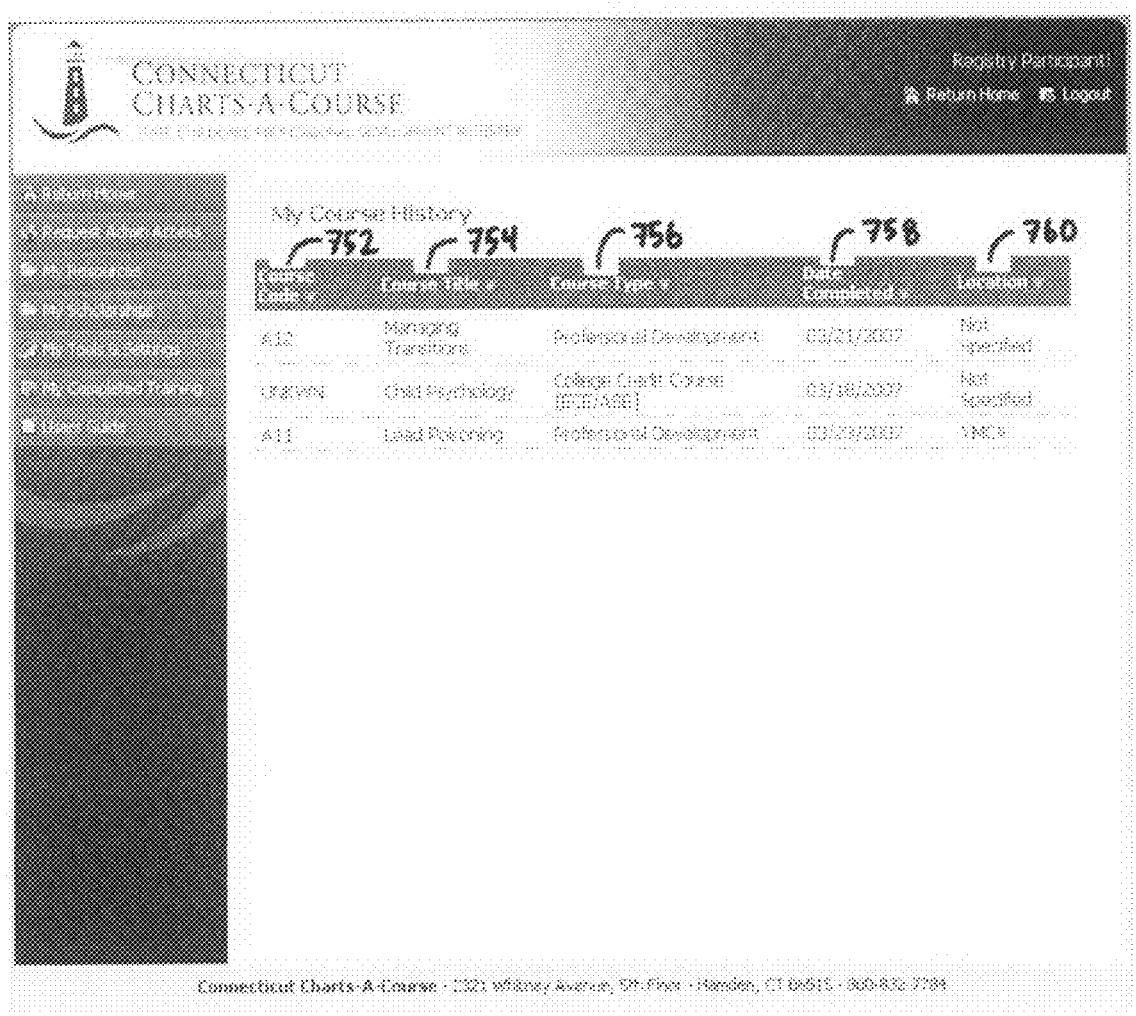
FIG. 7C shows a screen printout of an embodiment of a course history screen of a system for managing a career ladder of a participant of a professional development registry system of the present application.

FIG. 7C shows a screen printout of an embodiment of a course history screen of a system for managing a career ladder of a participant according to at least one embodiment of professional development registry system 100. In the embodiment shown in FIG. 7C, course history screen 750 comprises data representative of at least one participant attribute, namely completed courses in this particular embodiment. As shown in this embodiment, course history screen comprises data representative of one or more completed course codes 752, completed course titles 754, completed course types 756, completed course date 758, and completed course locations 760. A participant may access course history screen 750 to identify one or more completed courses and details pertaining to those courses. It can be appreciated that if a participant has not yet completed any courses, or if the participant does not yet have any data representative of at least one requirement 604, course history screen 750 may not include any substantive data for that participant.

In an embodiment of a system for managing a career ladder of a participant, the system comprises a processor 136 operable to compare data representative of at least one participant to the data representative of a career ladder to determine if at least one participant attribute satisfies any or all of the data representative of at least one requirement 604. If a participant attribute satisfies the data representative of at least one requirement 604, a participant may satisfy that particular level 602 within a career ladder 600.

In another embodiment of a system for managing a career ladder of a participant, the system comprises a processor 136 operable to scan available career ladder requirements (present, for example, within storage medium 134) to determine if the at least one participant attribute satisfies any or all of the data representative of at least one requirement 604. If a participant attribute satisfies the data representative of at least one requirement 604, a participant may satisfy that particular level 602 within a career ladder 600.

A system for managing a career ladder of a participant according to at least one embodiment of professional development registry system 100 may allow a participant to manage more than one career ladder 600. For example, a participant may have two simultaneous career ladders 600, one for the participant to work towards obtaining a certificate in a particular field, and another for the participant to work towards obtaining an associate's degree. In such a system, the processor 136 is operable to compare the data representative of at least one participant to the data representative of a second career ladder to determine if data representative of at least one participant attribute satisfies any or all of the data representative of at least one requirement 604 of the data representative of a plurality of levels of the data representative of a second career ladder.

In at least one embodiment of a professional development registry system 100, the system comprises a system for managing a career ladder of a participant comprising a processor 136 and a storage medium 134 operably connected to the processor 136 wherein the storage medium 134 is capable of receiving and storing data representative of a first career ladder and data representative of at least one participant, wherein the data representative of a first career ladder comprises data representative of a plurality of levels 602, each of the data representative of a plurality of levels comprising data representative of at least one requirement 604, and wherein the data representative of at least one participant comprises data representative of at least one participant attribute, and wherein the processor 136 is operable to compare the data representative of at least one participant to the data representative of a first career ladder to determine if data representative of at least one participant attribute satisfies any or all of the data representative of at least one requirement 604.

It can be appreciated that a system for managing a career ladder of a participant according to one or more embodiments referenced herein overcome the shortcomings within the prior art. For example, a system for managing a career ladder level of a participant is electronic (not paper based), allowing for data to relate between one or more screens, effectively reducing the need for repetitive manual entry of data. In addition, a system for managing a career ladder of a participant as referenced herein may contain several aspects, including courses available to a participant, courses taken by a participant, data representative of at least one participant attribute, a participant's career ladder level, and requirements a participant must meet in order to advance to the next or final career ladder level, all of which may communicate with each other and/or interrelate with each other, providing benefits to a user above and beyond the limited aspects of individual systems that do not contain all such information.

Figure 8:
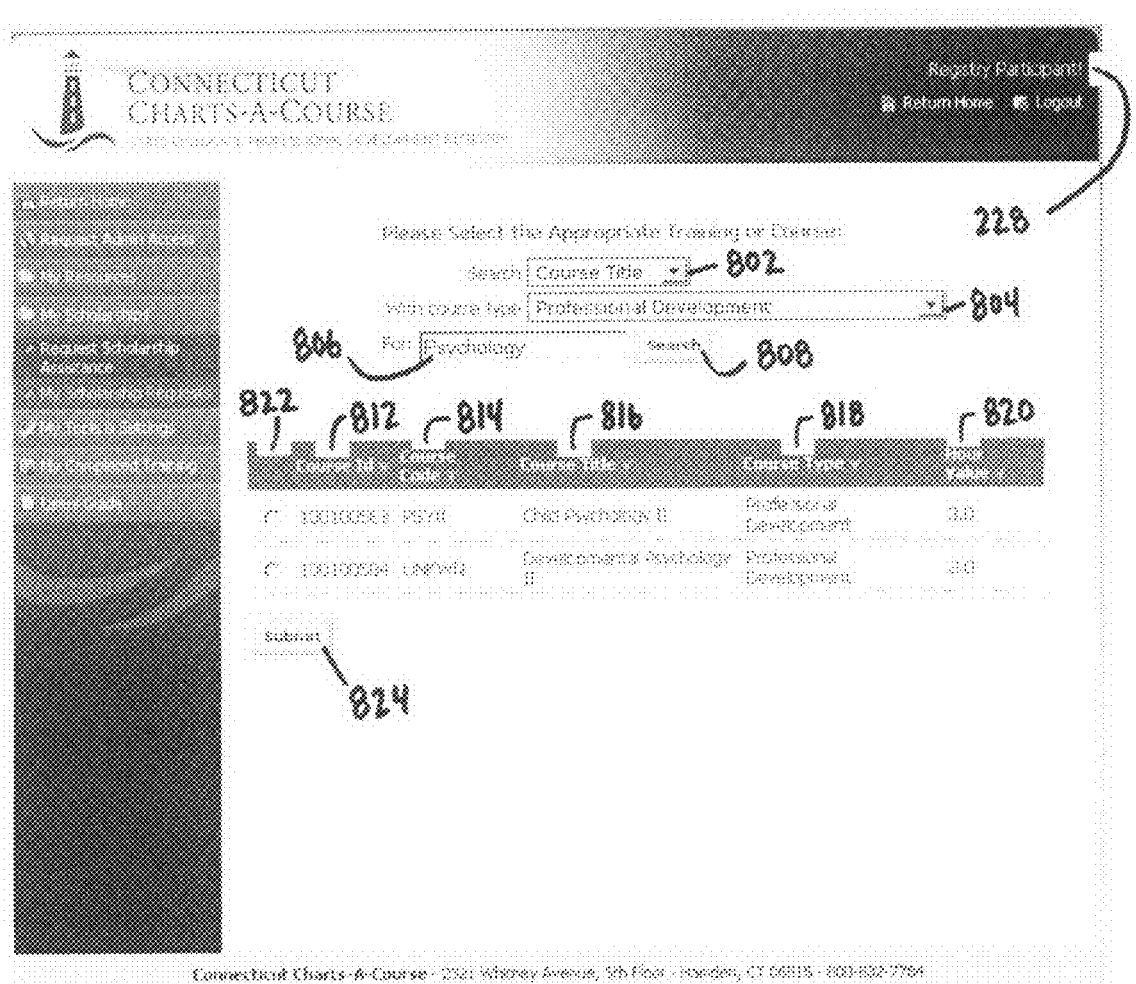
FIG. 8 shows a screen printout of an embodiment of a course selection screen of a system for processing scholarship requests of a professional development registry system of the present application.

FIG. 8 shows a screen printout of an embodiment of a course selection screen 800 of a system for processing scholarship requests according to at least one embodiment of professional development registry system 100. In the embodiment shown in FIG. 8, course selection screen 800 comprises a general course search field 802, a course type field 804, and a course keyword search field 806. In the embodiment shown in FIG. 8, course selection screen 800 comprises a personalized welcome message 228 comprising data representative of at least one scholarship requester, which may include, but is not limited to, a username, an identification number, a first name, a last name, and an email address. A user (shown as "Registry Participant" for this particular example, and also referred to as a "scholarship requester") seeking to identify a particular course or courses may either enter a course title within general course search field 802, or as shown in this particular embodiment, may select from a list of drop-down search options, such a list optionally including "Course Title" as shown in FIG. 8. Similarly, a user seeking to identify a type of course or courses may either enter a course type within course type field 804, or as shown in this embodiment, may select from a list of drop-down search options, an example of such including "Professional Development" as shown in this particular embodiment. A user may also enter one or more keywords into course keyword search field 806, for example "Psychology" as shown in the example course selection screen 800 shown in FIG. 8.

Once the user has entered and/or selected all desired information, the user may select search button 808 to obtain course information based upon the entered information, an example of which is shown in FIG. 8 in course search results window 810. Course search results window 810 may provide data representative of a scholarship request, which may itself comprise data representative of a training session, including, but not limited to, course number identifier 812, course code 814, course title 816, course type 818, and course hour value 820. Course search results window 810 may also optionally include course search results header 822 including the identifier names referenced above, and such identifier names may be selected by a user to sort the data representative of one or more training sessions by name and/or number. If the user identifies a target course of interest, the user may then "select" the course of interest and then select submit button 824 to submit that particular course and proceed to the next logical screen of professional development registry system 100.

Figure 9:
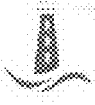
FIG. 9 shows a screen printout of an embodiment of a scholarship request information screen of a system for processing scholarship requests of a professional development registry system of the present application.

FIG. 9 shows a screen printout of an embodiment of a scholarship request information screen 900 of a system for processing scholarship requests according to at least one embodiment of professional development registry system 100. In the embodiment shown in FIG. 9, scholarship request confirmation screen 900 displays data representative of a training session 902, a semester selection field 904, and a year selection field 906. A user may either enter the particular semester in semester selection field 904 for which the user is requesting a scholarship, or as shown in this particular embodiment, the user may select from a list of drop-down search options, such a list optionally including "Spring" as shown in FIG. 9. A user may also enter the particular year in year selection field 906 for which the user is requesting a scholarship, or as shown in this particular embodiment, the user may select from a list of drop-down search options, such a list optionally including "2007" as shown in FIG. 9.

Scholarship request information screen 900 may also include a terms and conditions statement 908, a scholarship terms and agreement reference 910, and a terms and conditions acceptance field 912. Terms and conditions statement 908, as shown in FIG. 9, may comprise a statement affirming that the user has accepted any applicable terms and conditions for the scholarship request, and may comprise additional information including, but not limited to, comments pertaining to the availability of funding and comments that scholarship funding is not guaranteed. Scholarship terms and agreement reference 908 may be a hyperlink that, when selected by a user, would direct a user to a web page, browser window, pop-up window, or a functional equivalent of the same, containing any terms, conditions, and/or agreement pertaining to the scholarship request. In order to proceed with a scholarship request, a user would be required to "accept" any applicable terms and conditions for a scholarship, and may do so by selecting "Yes" from terms and conditions acceptance field 912. Once a user has "accepted" the terms and conditions, the user may then select continue button 914 to submit the scholarship information and to proceed to the next logical screen of professional development registry system 100.

Figure 10:
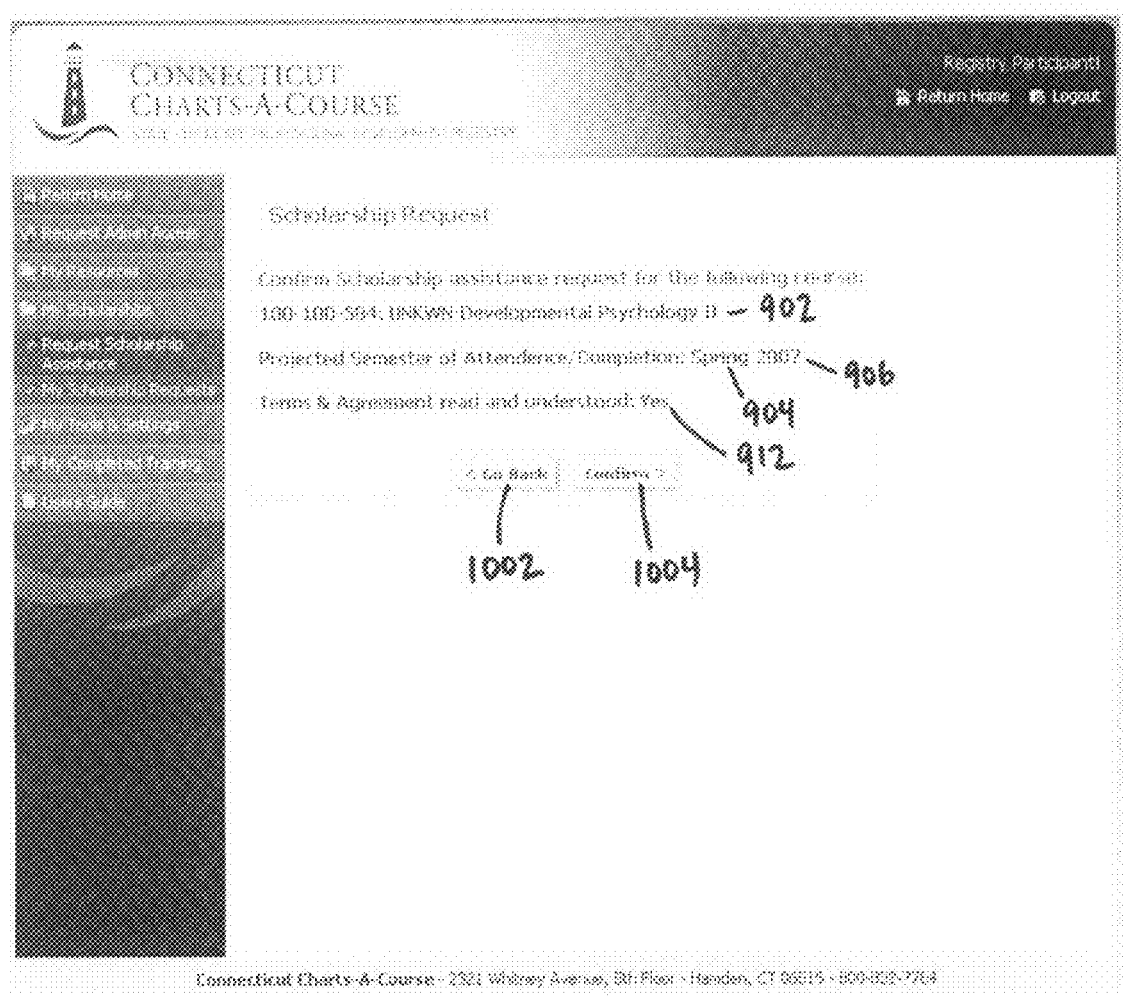
FIG. 10 shows a screen printout of an embodiment of a scholarship request confirmation screen of a system for processing scholarship requests of a professional development registry system of the present application.

FIG. 10 shows a screen printout of an embodiment of a scholarship request confirmation screen 1000 of a system for processing scholarship requests according to at least one embodiment of professional development registry system 100. In the embodiment shown in FIG. 10, scholarship request confirmation screen 1000 displays data representative of a training session 902, data representative of the semester selection field 904, and data representative of the year selection field 906. Scholarship request confirmation screen 1000 may also display other data representative of a scholarship request, including data representative of a confirmation that any term(s) and condition(s) applicable to the scholarship request has/have been accepted by the user requesting the scholarship, such data corresponding to the user's selection made from terms and conditions acceptance field 912 as shown in FIG. 9, and optionally (not shown in FIG. 9) data representative of at least one scholarship amount requested. If a user disagrees with the information shown in scholarship request confirmation screen 1000, the user may select go back button 1002 to return to the previous logical screen within professional development registry system 100. Alternatively, if a user agrees with the information shown in scholarship request confirmation screen 1000, the user may select confirm button 1004 to proceed to the next logical screen of professional development registry system 100.

Figure 11:
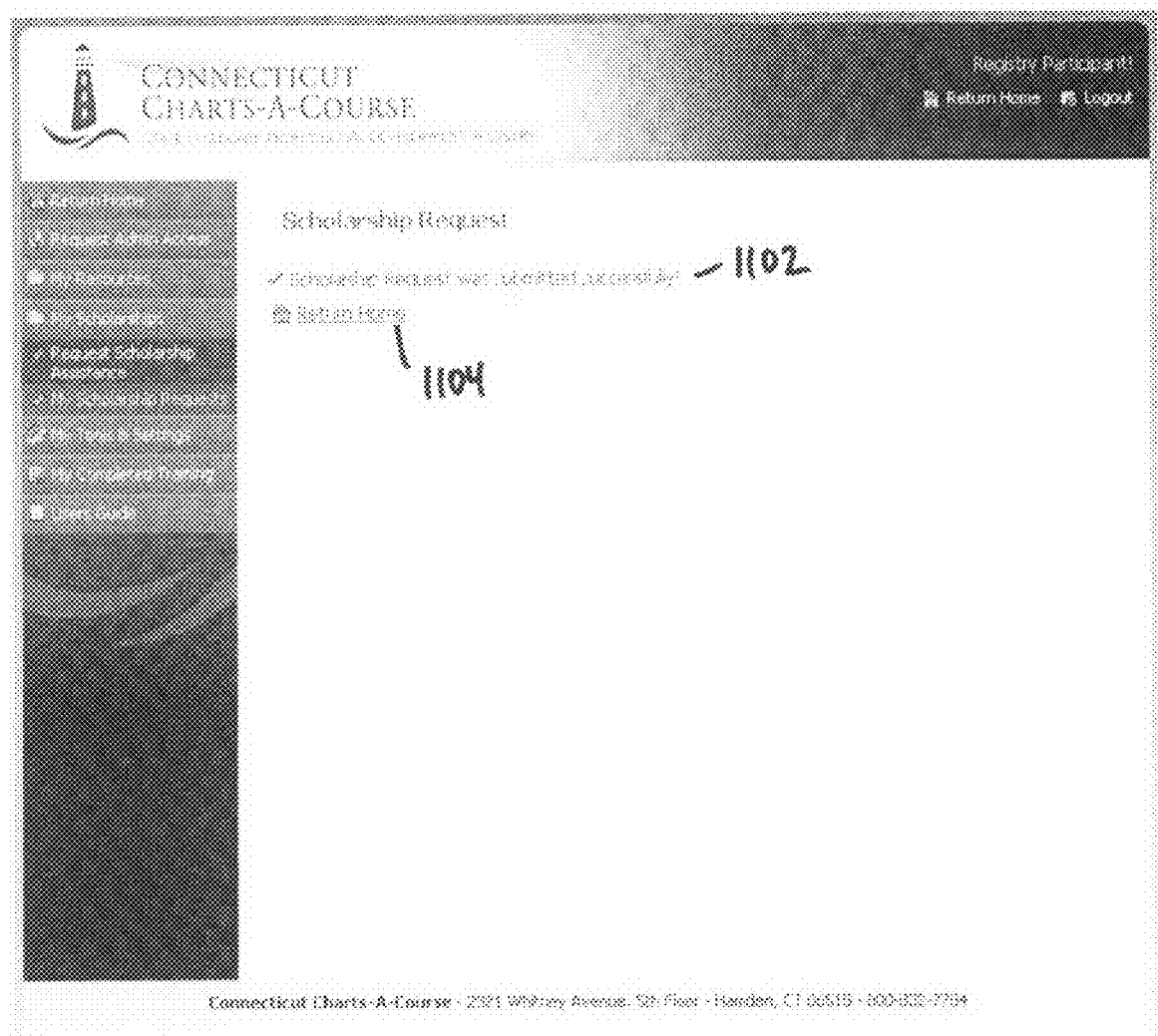
FIG. 11 shows a screen printout of an embodiment of a scholarship request submission screen of a system for processing scholarship requests of a professional development registry system of the present application.

FIG. 11 shows a screen printout of an embodiment of a scholarship request submission screen 1100 of a system for processing scholarship requests according to at least one embodiment of professional development registry system 100. In the embodiment shown in FIG. 11, scholarship request submission screen 1100 displays confirmation statement 1102 that a scholarship request was successfully submitted. Scholarship request submission screen 1100 may also optionally include a return home button 1104, which when selected by a user would transfer the user to the designated "home" screen of professional development registry system 100.

Figure 12:
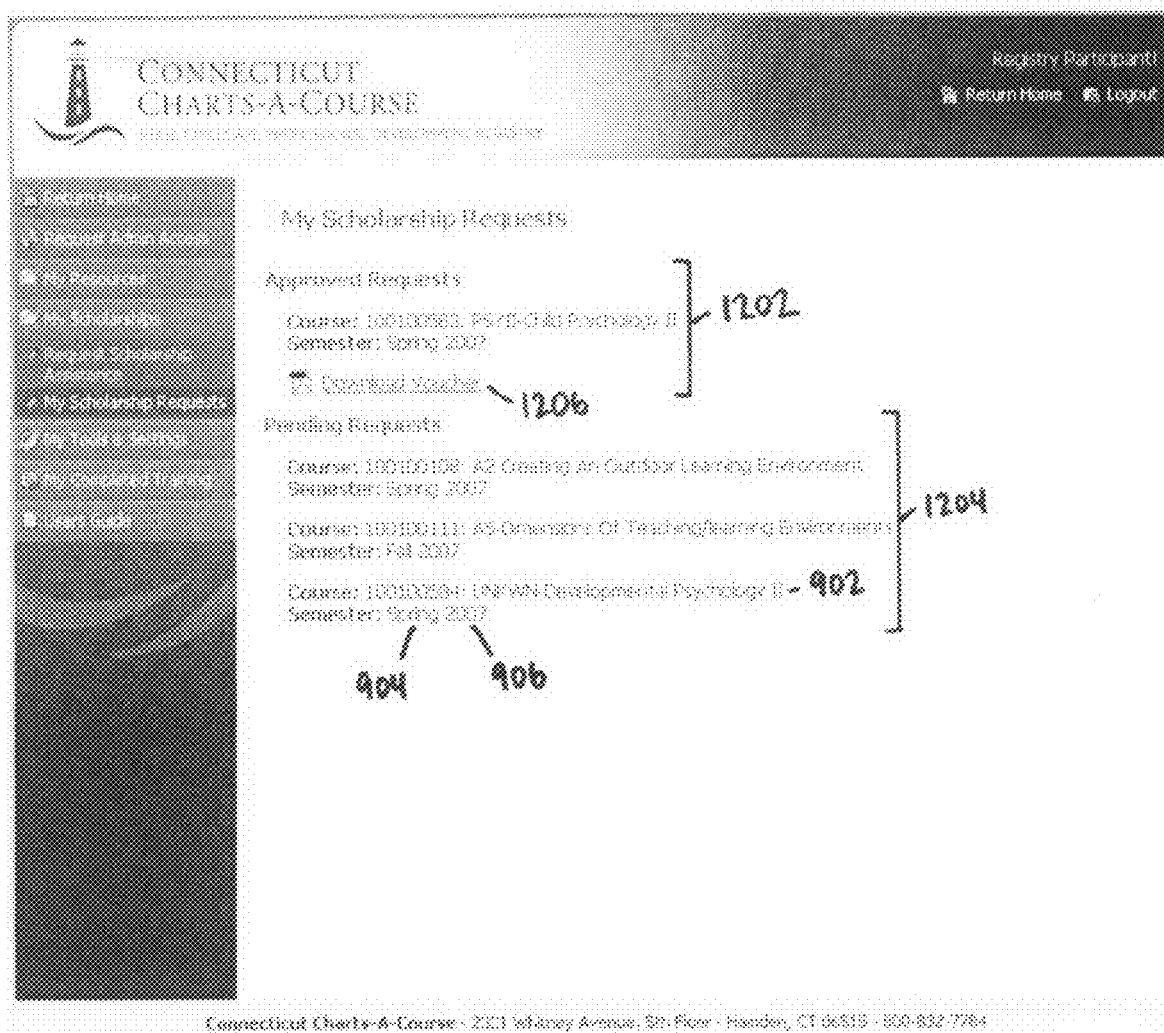
FIG. 12 shows a screen printout of an embodiment of a scholarship request status screen of a system for processing scholarship requests of a professional development registry system of the present application.

FIG. 12 shows a screen printout of an embodiment of a scholarship request status screen 1200 of a system for processing scholarship requests according to at least one embodiment of professional development registry system 100. A user may access scholarship request status screen 1200 to identify the status of one or more submitted scholarship requests. In the embodiment shown in FIG. 12, scholarship request status screen 1200 includes an approved requests section 1202 and a pending requests section 1204. In either or both of the approved requests section 1202 and a pending requests section 1204, data representative of a training session 902, data representative of the semester selection field 904, and data representative of the year selection field 906 may be shown. If a user has an approved scholarship request, the user may view and/or download a scholarship voucher form by selecting download voucher hyperlink 1206.

In an embodiment of a system for processing scholarship requests, a determination if a scholarship request related to the data representative of at least one scholarship request should be approved or denied based upon at least one approval process. The at least one approval process may be performed by an administrator or performed by the processor based upon data representative of at least one scholarship request and data representative of at least one scholarship requirement.

A system for processing scholarship requests may report the status of a scholarship request to a requester. This may be accomplished by a "push" report to a requester, for example by email, postal mail, telephone message, and the like, or may be accomplished by a "pull" report by a requester, for example accessible by a requester upon the requester's access to the system. Any number of statuses may be reported to a requester, including, but not limited to, an approved status, a denied status, and a pending status.

In at least one embodiment of a professional development registry system 100, the system comprises a system for processing scholarship requests comprising a processor 136 and a storage medium 134 operably connected to the processor 136, the storage medium 134 capable of receiving and storing data representative of at least one scholarship request and data representative of at least one scholarship requirement, wherein the data representative of at least one scholarship request comprises data representative of at least one training session 902 and data representative of a confirmation that any term(s) and condition(s) applicable to the scholarship request has/have been accepted by the requester, and wherein a determination if a scholarship request related to the data representative of at least one scholarship request should be approved or denied based upon at least one approval process, the at least one approval process performed by an administrator or performed by the processor based upon data representative of at least one scholarship request and data representative of at least one scholarship requirement, and wherein the processor 136 is operable to report a status of scholarship request to a requester.

It can be appreciated that a system for processing scholarship requests according to one or more embodiments referenced herein overcome the shortcomings within the prior art. For example, a system for processing scholarship requests is electronic (not paper based), allowing for data to relate between one or more screens, effectively reducing the need for repetitive manual entry of data. In addition, a system for processing scholarship requests as referenced herein may contain several aspects, including data representative of at least one training session and the relationship of such data to data representative of at least one scholarship request, all of which may communicate with each other and/or interrelate with each other, providing benefits to a scholarship requester above and beyond the limited aspects of individual systems that do not contain all such information. Furthermore, such a system allows for faster review of scholarship requests and a streamlined approach to scholarship requests, providing both the requester and the administrator with a more efficient system than is presently available within the prior art.

Figure 13:
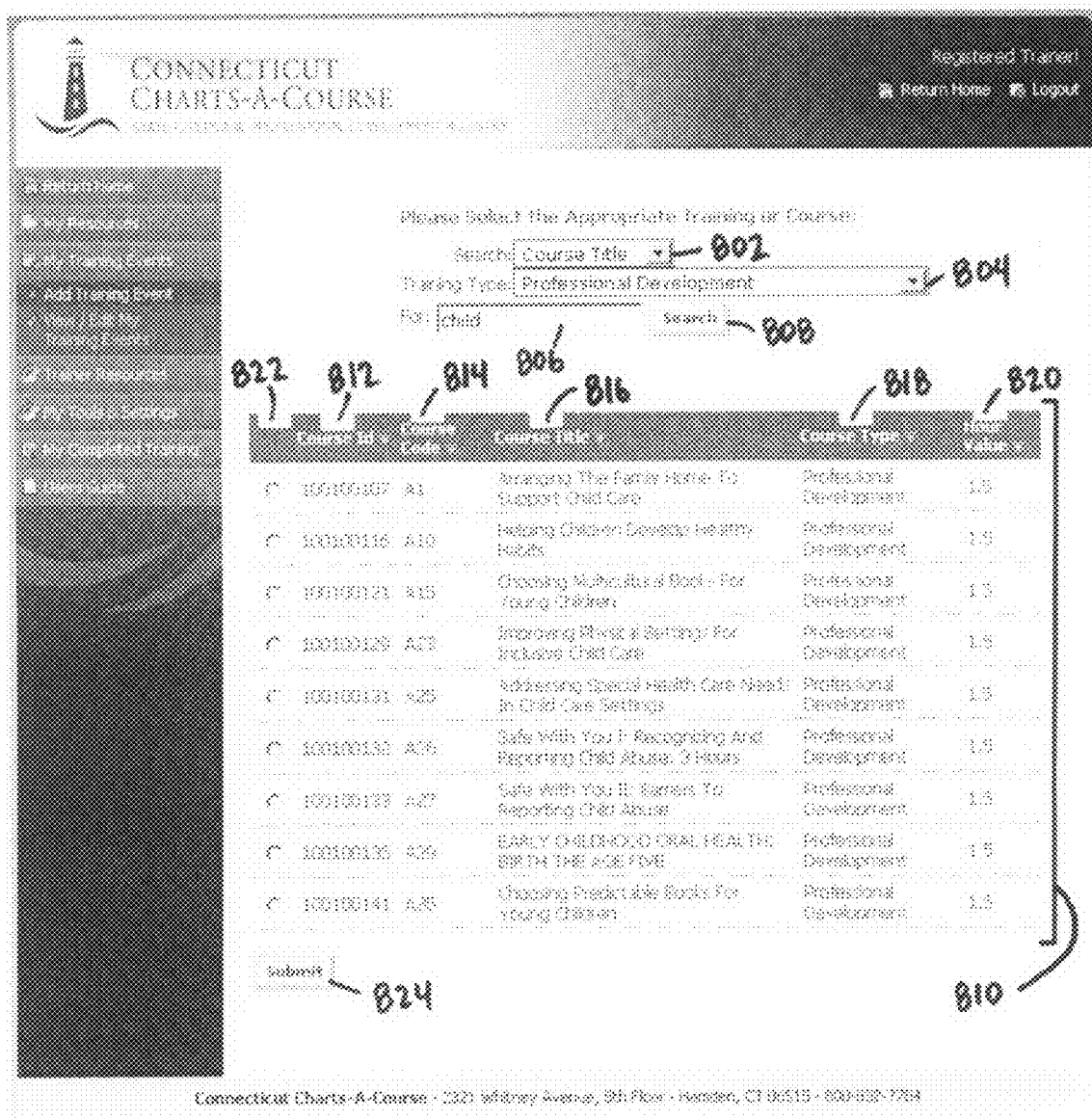
FIG. 13 shows a screen printout of an embodiment of a trainer course selection screen of a system for managing training sessions of a professional development registry system of the present application.

FIG. 13 shows a screen printout of an embodiment of a trainer course selection screen 1300 of a system for managing training sessions according to at least one embodiment of professional development registry system 100. In the embodiment shown in FIG. 13, trainer course selection screen 1300 comprises a general course search field 802, a course type field 804, and a course keyword search field 806. A training session manager (referred to as a "trainer" and shown as "Registered Trainer" for this particular example) seeking to identify a particular course or courses may either enter a course title within general course search field 802, or as shown in this particular embodiment, may select from a list of drop-down search options, such a list optionally including "Course Title" as shown in FIG. 13. Similarly, a trainer seeking to identify a type of course or courses may either enter a course type within course type field 804, or as shown in this embodiment, may select from a list of drop-down search options, an example of such including "Professional Development" as shown in this particular embodiment. A trainer may also enter one or more keywords into course keyword search field 806, for example "child" as shown in the example trainer course selection screen 1300 shown in FIG. 13.

Once the trainer has entered and/or selected all desired information, the trainer may select search button 808 to obtain course information based upon the entered information, an example of which is shown in FIG. 13 in course search results window 810. Course search results window 810 may provide data representative of a training session, including, but not limited to, course number identifier 812, course code 814, course title 816, course type 818, and course hour value 820. Course search results window 810 may also optionally include course search results header 822 including the identifier names referenced above, and such identifier names may be selected by a trainer to sort the data representative of one or more training sessions by name and/or number. If the trainer identifies a target course of interest, the trainer may then "select" the course of interest and then select submit button 824 to submit that particular course and proceed to the next logical screen of professional development registry system 100.

Figure 14:
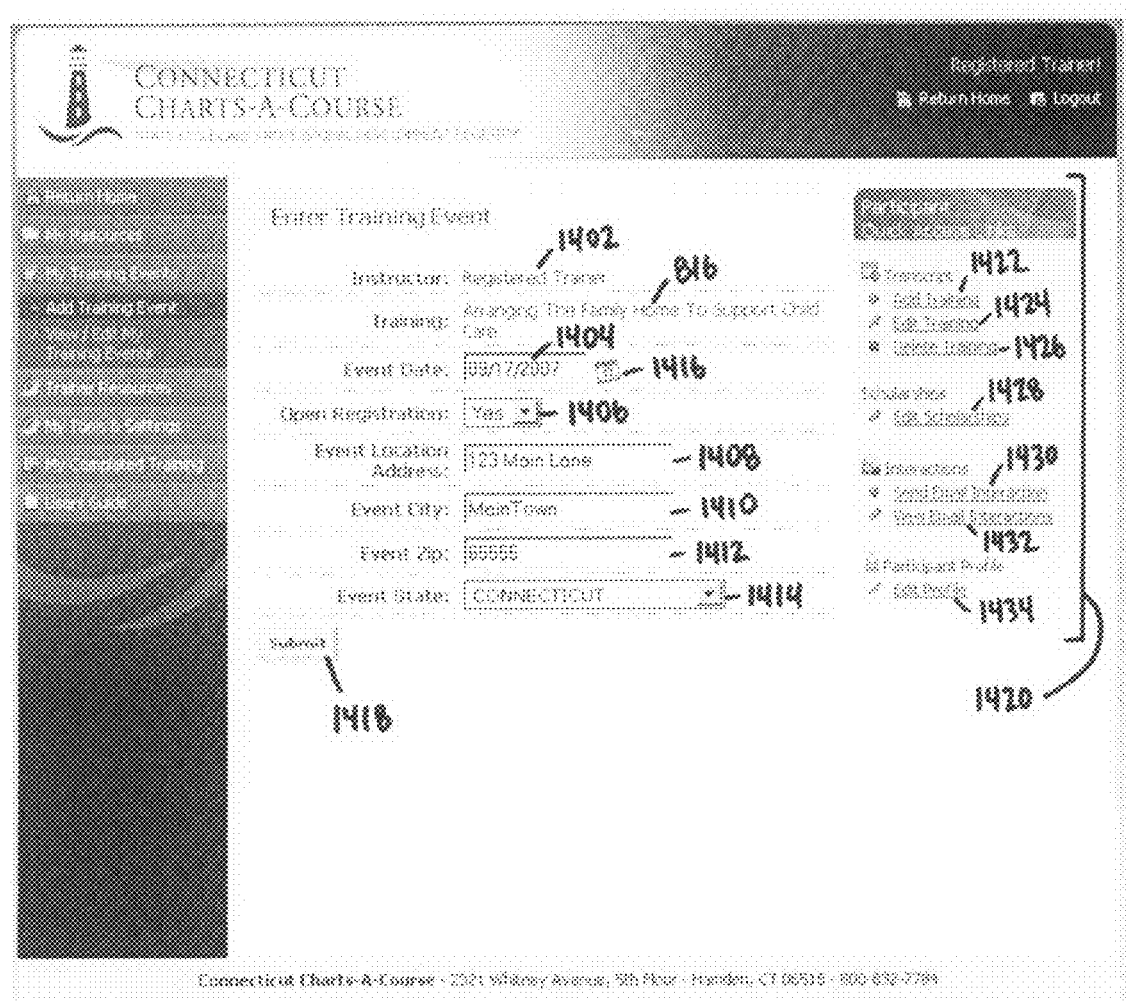
FIG. 14 shows a screen printout of an embodiment of an enter training event screen of a system for managing training sessions of a professional development registry system of the present application.

FIG. 14 shows a screen printout of an embodiment of an enter training event screen 1400 of a system for managing training sessions according to at least one embodiment of professional development registry system 100. In the embodiment shown in FIG. 14, enter training event screen 1400 comprises data representative of a training event, including, but not limited to, data representative of an instructor 1402 and a course title 816. Enter training event screen 1400 may also comprise a plurality of parameters identifying a training event, including, but not limited to, a course date 1404, open/closed registration parameter 1406, course location 1408, course location city 1410, course location zip code 1412, and course location state 1414. Course date 1404 may comprise one or more dates when a particular course will be held. Course location date 1404 may also be accompanied by a hyperlinked calendar icon 1416, which when selected by a trainer would open a calendar window and/or screen so that the trainer may view one or more calendars to assist with the selection of one or more course location dates 1404. Open/closed registration parameter 1406 may identify if a particular course is open or closed for participant registration. Course location 1408 may comprise a street address and/or a recognizable location such as a particular hotel, governmental building, campus facility, convention center, and the like. It can also be appreciated that a course may be made available to participants online (via computer connection), and/or via teleconference (via telephone), and such a course may not have a particular course location 1408, course location city 1410, course location zip code 1412, and/or course location state 1414. One a trainer has entered/selected all desired information within enter training event screen 1400, the trainer may select submit button 1418 to submit that course information and proceed to the next logical screen of professional development registry system 100.

Enter training event screen 1400, as shown in the embodiment of FIG. 14, may comprise a trainer quick access links section 1420. Trainer quick access links section 1420 may comprise one or more hyperlinks to allow a trainer, when a particular hyperlink is selected, to proceed to the desired screen for managing training sessions. Exemplary hyperlinks include, but are not limited to, a transcript add training hyperlink 1422, a transcript edit training hyperlink 1424, a transcript delete training hyperlink 1426, an edit scholarships hyperlink 1428, a send email interaction hyperlink 1430, a view email interaction hyperlink 1432, and an edit participant profile hyperlink 1434. Transcript add training hyperlink 1422, transcript edit training hyperlink 1424, and transcript delete training hyperlink 1426 may be selected by a trainer to direct the trainer to screens within professional development registry system 100 to allow the trainer to add, edit, and delete transcripts and/or transcript information, respectively. The selection of send email interaction hyperlink 1430 or view email interaction hyperlink 1432 by a trainer will direct the trainer to screens within professional development registry system 100 to allow the send or view email, respectively. A trainer may also select edit participant profile hyperlink 1434 to access a screen where the trainer may edit information pertaining to a participant's system profile.

Figure 15:
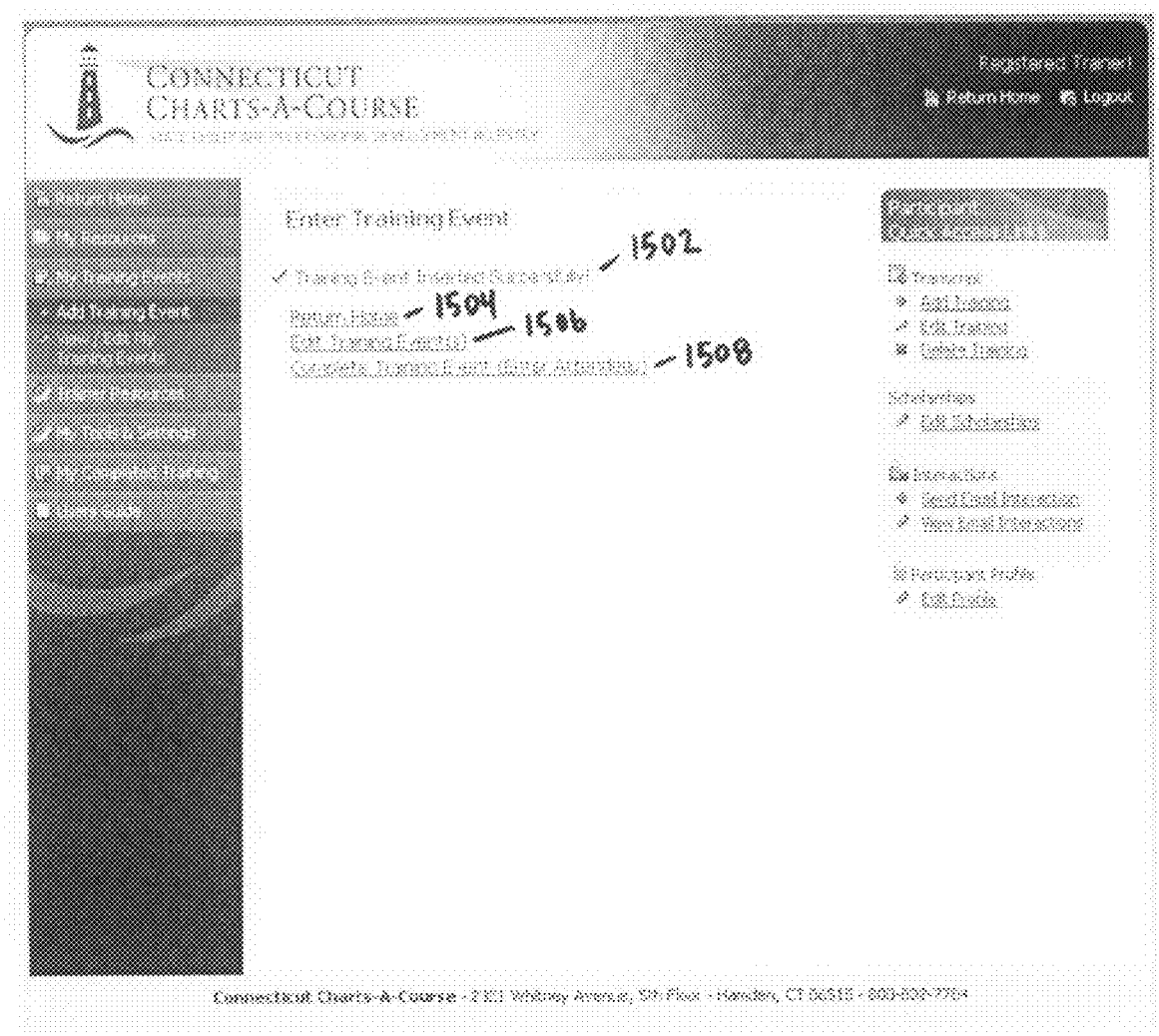
FIG. 15 shows a screen printout of an embodiment of a training event entered confirmation screen of a system for managing training sessions of a professional development registry system of the present application.

FIG. 15 shows a screen printout of an embodiment of a training event entered confirmation screen 1500 of a system for managing training sessions according to at least one embodiment of professional development registry system 100. In the embodiment shown in FIG. 15, training event entered confirmation screen 1500 comprises a training confirmation statement 1502 to alert the trainer that the training information added via enter training event screen 1400 was either added successfully or not added successfully. In the example shown within the embodiment shown in FIG. 15, the trainer successfully entered information via enter training event screen 1400 and training confirmation statement 1502 reads "Training Event Entered Successfully." From this screen, a trainer may select return home hyperlink 1504 to transfer the trainer to the designated "home" screen of professional development registry system 100. Training event entered confirmation screen 1500 may also include an edit training hyperlink 1506 which, when selected by a trainer, would transfer the trainer to a screen within professional development registry system 100 to allow the trainer to edit training information. Training event entered confirmation screen 1500 may also include a complete training event hyperlink 1508 which, when selected by a trainer, would transfer the trainer to a screen within professional development registry system 100 to allow the trainer to "complete" the training event information by entering attendees. An example of such a screen is referenced herein as FIG. 16. In addition, training event entered confirmation screen 1500, along with any number of other relevant screens described herein, may include trainer quick access links section 1420 as previously described.

Figure 16:
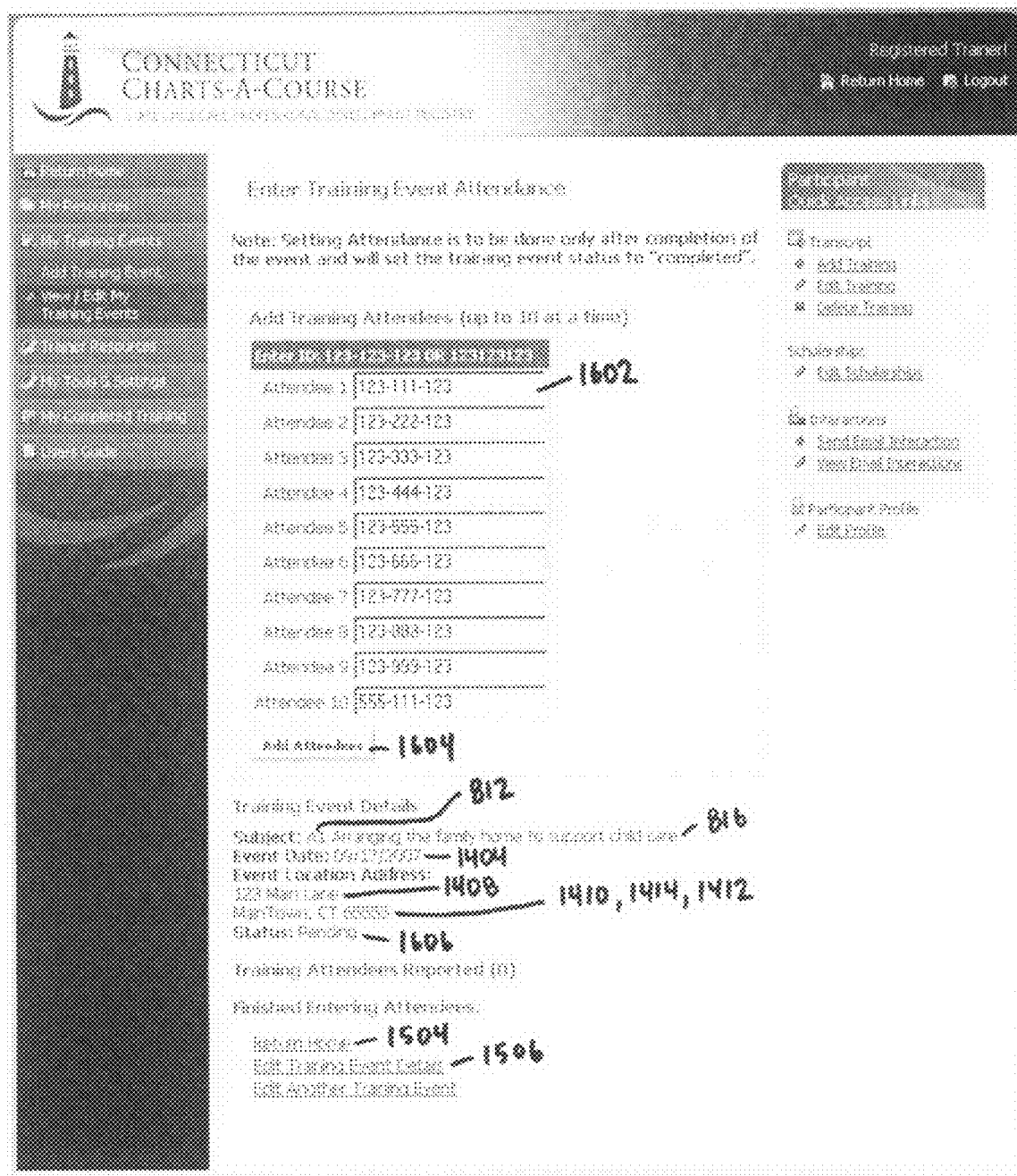
FIG. 16 shows a screen printout of an embodiment of a training event attendance screen of a system for managing training sessions of a professional development registry system of the present application.

From training event entered confirmation screen 1500, and optionally from one or more other screens for managing training sessions as described herein, a trainer may select complete training event hyperlink 1508 to transfer the trainer to enter training event attendance screen 1600, an embodiment of which is shown in FIG. 16. As shown in FIG. 16, a trainer may enter data representative of one or more training participants in one or more training participant identifier fields 1602, including, but not limited to, a participant's username, identification number, first name, last name, and email address. In the embodiment shown in FIG. 16, a trainer may add one or more participant identification numbers as attendees of a particular training event. Once a trainer has added the desired data representative of one or more training participants in one or more training participant identifier fields 1602 within enter training event attendance screen 1600, the trainer may select add attendees button 1604 to add those particular participants as attendees for a particular training session. The training session itself may also be identified within enter training event attendance screen 1600, including, but not limited to, course title 816, course location date 1404, course location 1408, course location city 1410, course location state 1414, and/or course location zip code 1412. A course status identifier 1606 may also be present within enter training event attendance screen 1600, identifying the status of a particular course for reference by the trainer.

Enter training event attendance screen 1600 may also comprise, as shown in FIG. 16, return home hyperlink 1504 to transfer the trainer to the designated "home" screen of professional development registry system 100 once selected by the trainer. Enter training event attendance screen 1600 may also include an edit training hyperlink 1506 which, when selected by a trainer, would transfer the trainer to a screen within professional development registry system 100 to allow the trainer to edit training information. Enter training event attendance screen 1600 may also include edit another training event hyperlink 1608, which, when selected by a trainer, would allow a trainer to edit similarly to when a trainer selects edit training hyperlink 1506, but instead transferring the trainer to a screen where a different training event than the one presently being displayed may be edited.

Figure 17:
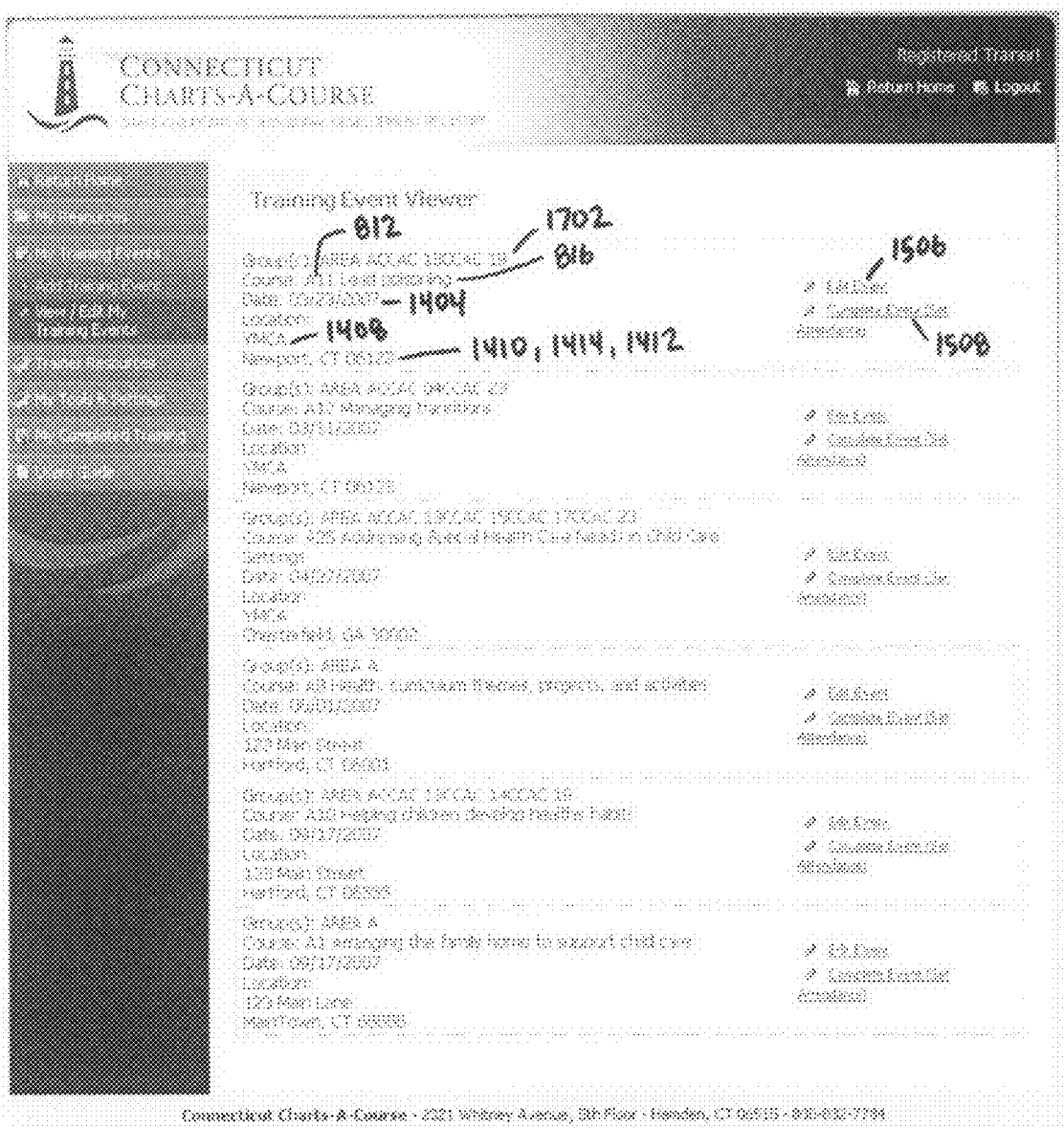
FIG. 17 shows a screen printout of an embodiment of a training event viewer screen of a system for managing training sessions of a professional development registry system of the present application.

FIG. 17 shows a screen printout of an embodiment of a training event viewer screen 1700 of a system for managing training sessions according to at least one embodiment of professional development registry system 100. In the embodiment shown in FIG. 17, training event viewer screen 1700 comprises data representative of a training session, including, but not limited to, course number identifier 812 and course title 816. Data representative of one or more groups 1702 may also be shown, such data comprising one or more codes that identify one or more training groups accessing professional development registry system 100. Training event viewer screen 1700 may also comprise a plurality of parameters identifying one or more training events, including, but not limited to, a course date 1404, course location 1408, course location city 1410, course location state 1414, course location zip code 1412. Training event viewer screen 1700 also include an edit training hyperlink 1506 which, when selected by a trainer, would transfer the trainer to a screen within professional development registry system 100 to allow the trainer to edit training information, and complete training event hyperlink 1508 which, when selected by a trainer, would transfer the trainer to a screen within professional development registry system 100 to allow the trainer to "complete" the training event information by entering attendees.

Figure 18:
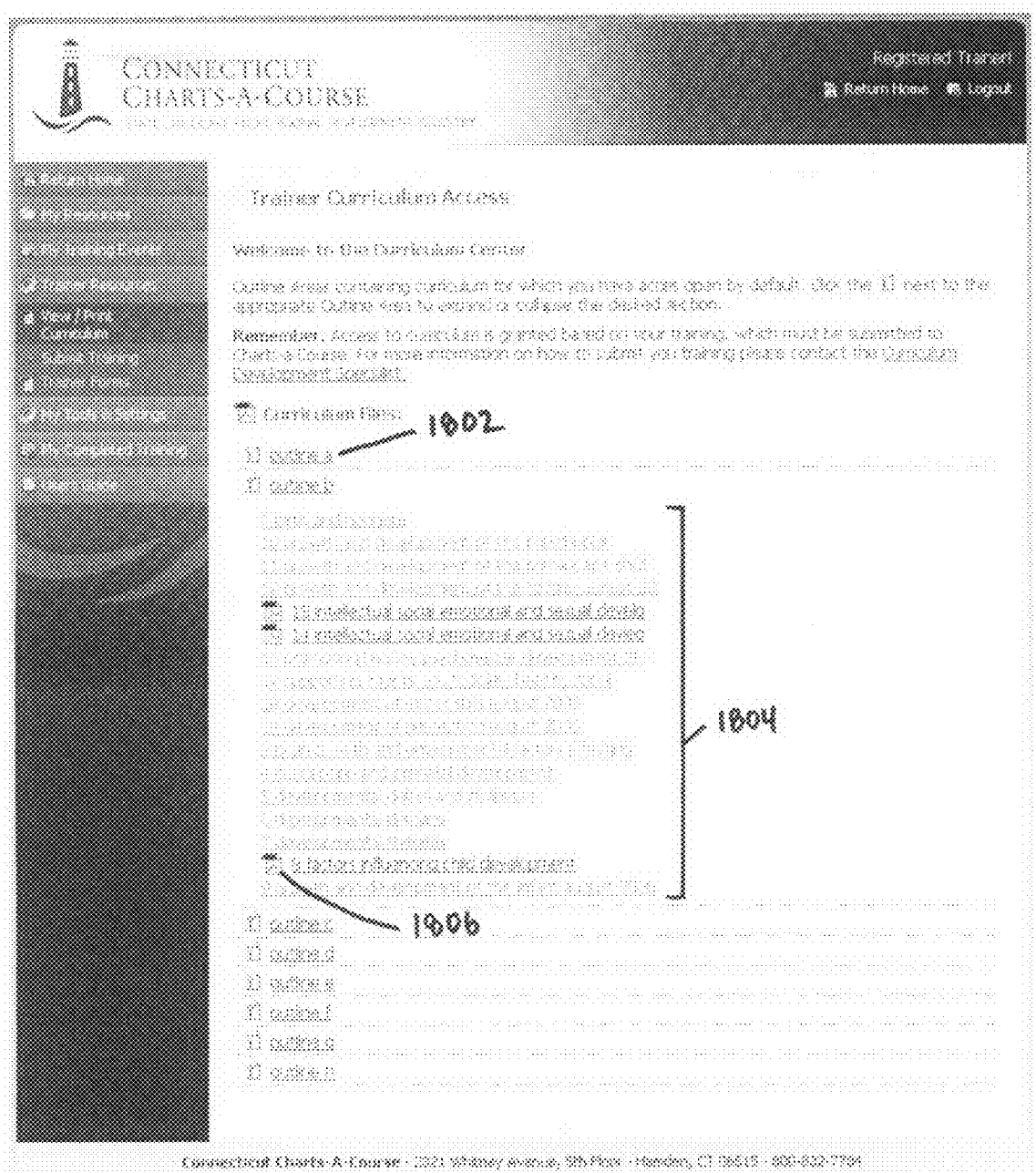
FIG. 18 shows a screen printout of an embodiment of a trainer curriculum access screen of a system for managing training sessions of a professional development registry system of the present application.
Figure 19:
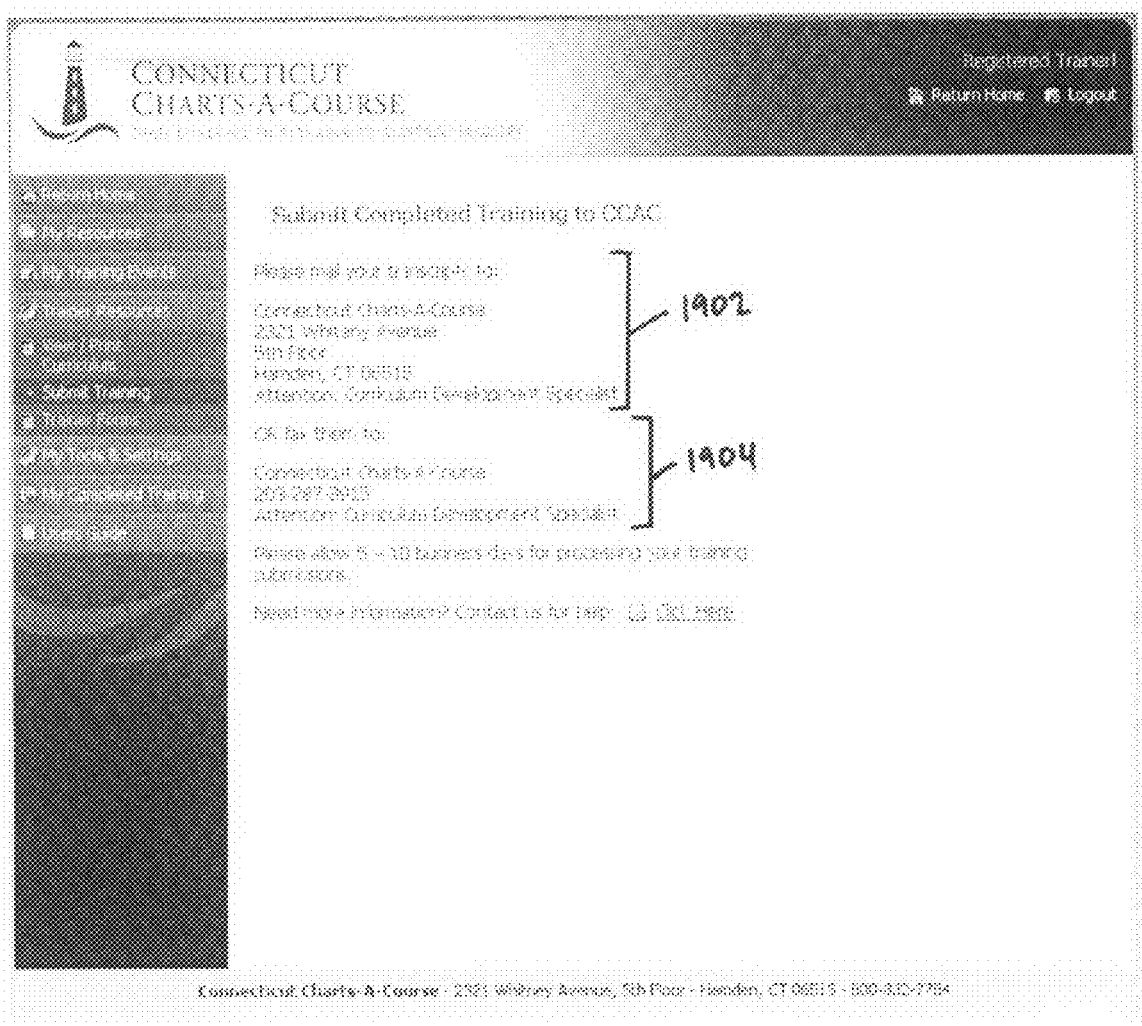
FIG. 19 shows a screen printout of an embodiment of a submit completed training screen of a system for managing training sessions of a professional development registry system of the present application.

FIG. 18 shows a screen printout of an embodiment of a trainer curriculum access screen 1800 of a system for managing training sessions according to at least one embodiment of professional development registry system 100. In the embodiment shown in FIG. 18, trainer curriculum access screen 1800 comprises one or more curriculum outlines 1802 each comprising individual curriculum entries 1804 available to a trainer. As shown in the example shown in FIG. 18, some of the individual curriculum entries 1804 are accessible by a trainer (as denoted by one or more document icons 1806), and others (without document icons in this particular example) are not accessible by a trainer. A trainer, provided with the required access by an administrator of professional development registry system 100, may access trainer curriculum access screen 1800 to review and/or download one or more one or more curriculum outlines 1802 and/or individual curriculum entries 1804 as desired by the trainer FIG. 19 shows a screen printout of an embodiment of a submit completed training screen 1900 of a system for managing training sessions according to at least one embodiment of professional development registry system 100. In the embodiment shown in FIG. 19, submit completed training screen 1900 comprises a transcript mailing address 1902 and a transcript facsimile information 1904, providing a trainer with information to mail and/or fax transcript information, respectively.

In an embodiment of a system for managing training sessions, the system comprises a processor 136 operable to receive input from a training session manager to modify and/or delete data representative of at least one training event. In a similar fashion to a system for processing scholarship requests as described herein, a system for managing training sessions, via processor 136, may report the modified data to a user of the system. This may be accomplished by a "push" report to a user, for example by email, postal mail, telephone message, and the like, or may be accomplished by a "pull" report by a user, for example accessible by a requester upon the requester's access to the system.

In at least one embodiment of a professional development registry system 100, the system comprises a system for managing training sessions by a training session manager comprising a processor 136 and a storage medium 134 operably connected to the processor 136, the storage medium 134 capable of receiving and storing data representative of at least one training event, wherein the data representative of at least one training event comprises a plurality of parameters identifying a training event, and wherein the processor 136 is operable to receive input from a training session manager to modify and/or delete data representative of at least one training event, the training session manager affiliated with at least one training event, and wherein the processor 136 is operable to report the modified data to a user of professional development registry system 100.

It can be appreciated that a system for managing training sessions according to one or more embodiments referenced herein overcome the shortcomings within the prior art. For example, a system for managing training sessions is electronic (not paper based), allowing for data to relate between one or more screens, effectively reducing the need for repetitive manual entry of data. In addition, a system for managing training sessions as referenced herein may contain several aspects, including the ability of the system to receive input from a training session manager to modify and/or delete data representative of at least one training event and the ability of the system to report said modified data to a user of the system, providing benefits to a training session manager above and beyond the limited aspects of individual systems that do not contain all such information.

It can be appreciated that any number of the individual hyperlinks referenced herein may be present on screens within professional development registry system 100 other than those particular screens where one or more specific hyperlinks are referenced.

It can be appreciated that processor 136 and storage medium 134 referenced herein for the individual system aspects of professional development registry system 100 may be one in the same processor 136 and storage medium 134, respectively, within professional development registry system 100.

It can be appreciated that any number of the individual embodiments of individual system aspects of professional development registry system 100 may be present as one embodiment and are not intended in any way to be limited to separate embodiments that may neither comprise nor comprehend one another within professional development registry system 100.

The foregoing disclosure of the exemplary embodiments of the present application has been presented for purposes of illustration and description and can be further modified within the scope and spirit of this disclosure. It is not intended to be exhaustive or to limit the present disclosure to the precise forms disclosed. This application is therefore intended to cover any variations, uses, or adaptations of a system of the present application using its general principles. Further, this application is intended to cover such departures from the present disclosure as may come within known or customary practice in the art to which this system of the present application pertains. Many variations and modifications of the embodiments described herein will be apparent to one of ordinary skill in the art in light of the above disclosure. The system of the present application can be further modified within the scope and spirit of this disclosure. Further, this application is intended to cover such departures from the present disclosure as come within known or customary practice in the art to which this system of the present application pertains and which fall within the limits of the appended claims. The scope of the present disclosure is to be defined only by the claims appended hereto, and by their equivalents.

We claim:

1. A professional development registry system, comprising a processor; and a storage medium operably connected to the processor, the storage medium capable of receiving and storing data representative of a first career ladder, data representative of at least one participant, data representative of at least one scholarship request, data representative of at least one scholarship requirement, and data representative of at least one training event; wherein the data representative of a first career ladder comprises data representative of a plurality of levels, each of the data representative of a plurality of levels comprising data representative of at least one requirement; wherein the data representative of at least one participant comprises data representative of at least one participant attribute;

wherein the data representative of at least one scholarship request comprises data representative of at least one training session and data representative of a confirmation that any term(s) and condition(s) applicable to the scholarship request has/have been accepted by the requester, the data representative of at least one scholarship request further applicable to the data representative of at least one requirement; wherein a determination if a scholarship request related to the data representative of at least one scholarship request should be approved or denied based upon at least one approval process, the at least one approval process performed by an administrator or performed by the processor based upon data representative of at least one scholarship request and data representative of at least one scholarship requirement; wherein the data representative of at least one training event comprises a plurality of parameters identifying a training event; and wherein the processor is configured to compare the data representative of at least one participant to the data representative of a first career ladder to determine if data representative of at least one participant attribute satisfies any or all of the data representative of at least one requirement, is configured to report a status of scholarship request to a requester, and is configured to receive input from a training session manager to modify and/or delete data representative of at least one training event, the training session manager affiliated with at least one training event, and to report the modified data to a user of the system.

2. The system of claim 1, wherein the data representative of at least one requirement comprises data representative of a requirement for advancement of at least one participant in accordance with the data representative of a first career ladder.

3. The system of claim 1, wherein the data representative of at least one requirement comprises data representative of at least one parameter.

4. The system of claim 3, wherein the data representative of at least one parameter comprises data representative of at least one completed training session.

5. The system of claim 1, wherein the data representative of at least one participant further comprises data representative of at least one from the group consisting of a username, an identification number, a first name, a last name, and an email address.

6. The system of claim 1, further comprising data representative of a second career ladder, wherein said data is capable of being stored in and retrieved from the storage medium, wherein said data comprises data representative of a plurality of levels and wherein the data representative of a plurality of levels comprises data representative of at least one requirement, and wherein the processor is further configured to compare the data representative of at least one participant to the data representative of a second career ladder to determine if data representative of at least one participant attribute satisfies any or all of the data representative of at least one requirement of the data representative of a plurality of levels of the data representative of a second career ladder.

7. The system of claim 1, further comprising a program stored upon the storage medium, said program operable by the processor upon the data representative of at least one career ladder.

8. The system of claim 1, the system operably connected to at least one administrator computer and at least one participant computer through a network.

9. The system of claim 8, wherein the system is coupled within the administrator computer.

10. The system of claim 8, wherein the network comprises the Internet.

11. The system of claim 1, wherein the data representative of at least one scholarship request further comprises data representative of at least one scholarship requester.

12. The system of claim 11, wherein the data representative of at least one scholarship requester comprises data representative of at least one from the group consisting of a username, an identification number, a first name, a last name, and an email address.

13. The system of claim 1, wherein the data representative of at least one training session comprises data representative of at least one from the group consisting of a course number identifier, a course code identifier, a course title identifier, a semester term identifier, a semester year identifier, a scholarship request identifier, and a scholarship request date.

14. The system of claim 1, wherein the data representative of at least one scholarship request further comprises data representative of at least one scholarship amount requested.

15. The system of claim 14, wherein the processor is further configured to compare data representative of at least one scholarship request to the data representative of at least one scholarship requirement to determine an amount of a scholarship based in part upon the data representative of at least one scholarship amount requested.

16. The system of claim 1, wherein the status of the at least one scholarship request is reported to the requester by email.

17. The system of claim 1, wherein the status of the at least one scholarship request is reported to the requester within the system, and wherein said status is available to the requester upon access to the system by the requester.

18. The system of claim 1, wherein the status reported to the requester comprises data representative of at least one from the group consisting of approved, denied, and pending.

19. The system of claim 1, wherein the processor is configured to compare data representative of at least one scholarship request to the data representative of at least one scholarship requirement to determine if a scholarship request related to the data representative of at least one scholarship request should be approved or denied.

20. The system of claim 1, wherein the processor is further configured to compare data representative of at least one scholarship request to data representative of at least one scholarship requirement to determine if a scholarship request related to the data representative of at least one scholarship request is accurate and/or complete.

21. The system of claim 1, further comprising a program stored upon the storage medium, said program operable by the processor upon the data representative of at least one scholarship request.

22. The system of claim 1, the system operably connected to at least one administrator computer and at least one requester computer through a network.

23. The system of claim 22, wherein the system is coupled within the administrator computer.

24. The system of claim 22, wherein the network comprises the Internet.

25. The system of claim 1, wherein the plurality of parameters identifying a training event comprises a time(s) of the at least one training event.

26. The system of claim 1, wherein the plurality of parameters identifying a training event comprises a date(s) of the at least one training event.

27. The system of claim 1, wherein the modified data is reported to the user by email.

28. The system of claim 1, wherein the modified data is reported to the user within the system, and wherein said modified data is available to the user upon access to the system by the user.

29. The system of claim 1, further comprising a program stored upon the storage medium, said program operable by the processor upon the data representative of at least one training event.

30. The system of claim 1, the system operably connected to at least one administrator computer and at least one training participant computer through a network.

31. The system of claim 30, wherein the system is coupled within the administrator computer.

32. The system of claim 30, wherein the network comprises the Internet.

33. A computer program having a plurality of program steps to be executed on a first computer having a processor and a storage medium to manage the professional development of a participant, the computer program operable by the processor to facilitate communication between the first computer and one or more user computers, the computer program configured to: identify and process data representative of a career ladder; identify and process data representative of at least one scholarship request; identify and process data representative of at least one training event; identify and process data representative of at least one participant; and communicate processed data representative of a career ladder, processed data representative of at least one scholarship request, and processed data representative of at least one training event to at least one participant.

34. A professional development registry system, comprising a processor; and a storage medium operably connected to the processor, the storage medium capable of receiving and storing data representative of a first career ladder, data representative of at least one participant, data representative of at least one scholarship request, data representative of at least one scholarship requirement, and data representative of at least one training event; wherein the data representative of a first career ladder comprises data representative of a plurality of levels, each of the data representative of a plurality of levels comprising data representative of at least one requirement; wherein the data representative of at least one participant comprises data representative of at least one participant attribute; wherein the data representative of at least one requirement comprises data representative of a requirement for advancement of at least one participant in accordance with the data representative of a first career ladder; wherein the data representative of at least one scholarship request comprises data representative of at least one training session and data representative of a confirmation that any term(s) and condition(s) applicable to the scholarship request has/have been accepted by the requester, the data representative of at least one scholarship request further applicable to the data representative of at least one requirement; wherein a determination if a scholarship request related to the data representative of at least one scholarship request should be approved or denied based upon at least one approval process, the at least one approval process performed by an administrator or performed by the processor based upon data representative of at least one scholarship request and data representative of at least one scholarship requirement; wherein the data representative of at least one training event comprises a plurality of parameters identifying a training event; and wherein the processor is configured to compare the data representative of at least one participant to the data representative of a first career ladder to determine if data representative of at least one participant attribute satisfies any or all of the data representative of at least one requirement, is configured to report a status of scholarship request to a requester, and is configured to receive input from a training session manager to modify and/or delete data representative of at least one training event, the training session manager affiliated with at least one training event, and to report the modified data to a user of the system.

35. A professional development registry system, comprising a processor; and a storage medium operably connected to the processor, the storage medium capable of receiving and storing data representative of a first career ladder, data representative of at least one participant, data representative of at least one scholarship request, data representative of at least one scholarship requirement, and data representative of at least one training event; wherein the data representative of a first career ladder comprises data representative of a plurality of levels, each of the data representative of a plurality of levels comprising data representative of at least one requirement; wherein the data representative of at least one participant comprises data representative of at least one participant attribute; wherein the data representative of at least one requirement comprises data representative of at least one parameter, the data representative of at least one parameter comprising data representative of at least one completed training session; wherein the data representative of at least one scholarship request comprises data representative of at least one training session and data representative of a confirmation that any term(s) and condition(s) applicable to the scholarship request has/have been accepted by the requester, the data representative of at least one scholarship request further applicable to the data representative of at least one requirement; wherein a determination if a scholarship request related to the data representative of at least one scholarship request should be approved or denied based upon at least one approval process, the at least one approval process performed by an administrator or performed by the processor based upon data representative of at least one scholarship request and data representative of at least one scholarship requirement; wherein the data representative of at least one training event comprises a plurality of parameters identifying a training event; and wherein the processor is configured to compare the data representative of at least one participant to the data representative of a first career ladder to determine if data representative of at least one participant attribute satisfies any or all of the data representative of at least one requirement, is configured to report a status of scholarship request to a requester, and is configured to receive input from a training session manager to modify and/or delete data representative of at least one training event, the training session manager affiliated with at least one training event, and to report the modified data to a user of the system.

36. A professional development registry system, comprising a processor; a storage medium operably connected to the processor, the storage medium capable of receiving and storing data representative of a first career ladder, data representative of at least one participant, data representative of at least one scholarship request, data representative of at least one scholarship requirement, and data representative of at least one training event; and a program stored upon the storage medium, said program operable by the processor upon the data representative of at least one career ladder; wherein the data representative of a first career ladder comprises data representative of a plurality of levels, each of the data representative of a plurality of levels comprising data representative of at least one requirement; wherein the data representative of at least one participant comprises data representative of at least one participant attribute; wherein the data representative of at least one requirement comprises data representative of a requirement for advancement of at least one participant in accordance with the data representative of a first career ladder; wherein the data representative of at least one scholarship request comprises data representative of at least one training session and data representative of a confirmation that any term(s) and condition(s) applicable to the scholarship request has/have been accepted by the requester, the data representative of at least one scholarship request further applicable to the data representative of at least one requirement; wherein a determination if a scholarship request related to the data representative of at least one scholarship request should be approved or denied based upon at least one approval process, the at least one approval process performed by an administrator or performed by the processor based upon data representative of at least one scholarship request and data representative of at least one scholarship requirement; wherein the data representative of at least one training event comprises a plurality of parameters identifying a training event; and wherein the processor is configured to compare the data representative of at least one participant to the data representative of a first career ladder to determine if data representative of at least one participant attribute satisfies any or all of the data representative of at least one requirement, is configured to report a status of scholarship request to a requester, and is configured to receive input from a training session manager to modify and/or delete data representative of at least one training event, the training session manager affiliated with at least one training event, and to report the modified data to a user of the system.

37. A professional development registry system, comprising a processor; a storage medium operably connected to the processor, the storage medium capable of receiving and storing data representative of a first career ladder, data representative of at least one participant, data representative of at least one scholarship request, data representative of at least one scholarship requirement, and data representative of at least one training event; wherein the data representative of a first career ladder comprises data representative of a plurality of levels, each of the data representative of a plurality of levels comprising data representative of at least one requirement; wherein the data representative of at least one participant comprises data representative of at least one participant attribute; wherein the data representative of at least one requirement comprises data representative of a requirement for advancement of at least one participant in accordance with the data representative of a first career ladder; wherein the data representative of at least one scholarship request comprises data representative of at least one training session and data representative of a confirmation that any term(s) and condition(s) applicable to the scholarship request has/have been accepted by the requester, the data representative of at least one scholarship request further applicable to the data representative of at least one requirement; wherein the data representative of at least one scholarship request further comprises data representative of at least one scholarship amount requested; wherein a determination if a scholarship request related to the data representative of at least one scholarship request should be approved or denied based upon at least one approval process, the at least one approval process performed by an administrator or performed by the processor based upon data representative of at least one scholarship request and data representative of at least one scholarship requirement; wherein the data representative of at least one training event comprises a plurality of parameters identifying a training event; and wherein the processor is configured to compare the data representative of at least one participant to the data representative of a first career ladder to determine if data representative of at least one participant attribute satisfies any or all of the data representative of at least one requirement, is configured to report a status of scholarship request to a requester, is configured to receive input from a training session manager to modify and/or delete data representative of at least one training event, the training session manager affiliated with at least one training event, and to report the modified data to a user of the system, and is configured to compare data representative of at least one scholarship request to the data representative of at least one scholarship requirement to determine an amount of a scholarship based in part upon the data representative of at least one scholarship amount requested.

38. A professional development registry system, comprising a processor; a storage medium operably connected to the processor, the storage medium capable of receiving and storing data representative of a first career ladder, data representative of at least one participant, data representative of at least one scholarship request, data representative of at least one scholarship requirement, and data representative of at least one training event; wherein the data representative of a first career ladder comprises data representative of a plurality of levels, each of the data representative of a plurality of levels comprising data representative of at least one requirement; wherein the data representative of at least one participant comprises data representative of at least one participant attribute; wherein the data representative of at least one requirement comprises data representative of a requirement for advancement of at least one participant in accordance with the data representative of a first career ladder; wherein the data representative of at least one scholarship request comprises data representative of at least one training session and data representative of a confirmation that any term(s) and condition(s) applicable to the scholarship request has/have been accepted by the requester, the data representative of at least one scholarship request further applicable to the data representative of at least one requirement; and wherein a determination if a scholarship request related to the data representative of at least one scholarship request should be approved or denied based upon at least one approval process, the at least one approval process performed by an administrator or performed by the processor based upon data representative of at least one scholarship request and data representative of at least one scholarship requirement; wherein the data representative of at least one training event comprises a plurality of parameters identifying a training event; and wherein the processor is configured to compare the data representative of at least one participant to the data representative of a first career ladder to determine if data representative of at least one participant attribute satisfies any or all of the data representative of at least one requirement, is configured to report a status of scholarship request to a requester, and is configured to receive input from a training session manager to modify and/or delete data representative of at least one training event, the training session manager affiliated with at least one training event, and to report the modified data to a user within the system, wherein said modified data is available to the user upon access to the system by the user.

39. The system of claim 1, wherein the at least one approval process is performed by an administrator or is performed by the processor based upon data representative of at least one scholarship request and data representative of at least one scholarship requirement.

40. The system of claim 1, wherein the processor is further configured to compare data representative of at least one scholarship request to data representative of at least one scholarship requirement to determine if a scholarship request related to the data representative of at least one scholarship request is accurate and/or complete.

41. The system of claim 35, further comprising a storage medium operably connected to the processor, the storage medium capable of storing said data.

42. The system of claim 35, further comprising a program stored upon the storage medium, said program operable by the processor upon said data.

43. The system of claim 35, the system operably connected to at least one administrator computer and at least one participant computer through a network.

44. The system of claim 37, further comprising a storage medium operably connected to the processor, the storage medium capable of storing said data.

45. The system of claim 37, further comprising a program stored upon the storage medium, said program operable by the processor upon said data.

46. The system of claim 37, the system operably connected to at least one administrator computer and at least one participant computer through a network.

47. The system of claim 38, further comprising a storage medium operably connected to the processor, the storage medium capable of storing said data.

48. A computer program having a plurality of program steps to be executed on a first computer having a processor and a storage medium to manage the professional development of a participant, the computer program operable by the processor to facilitate communication between the first computer and one or more user computers, the computer program configured to: identify and process data representative of a career ladder; identify and process data representative of at least one scholarship request; identify and process data representative of at least one training event; identify and process data representative of at least one participant; and communicate processed data representative of a career ladder, processed data representative of at least one scholarship request, and processed data representative of at least one training event to at least one participant, wherein the data representative of a first career ladder comprises data representative of a plurality of levels, each of the data representative of a plurality of levels comprising data representative of at least one requirement.

49. A computer program having a plurality of program steps to be executed on a first computer having a processor and a storage medium to manage the professional development of a participant, the computer program operable by the processor to facilitate communication between the first computer and one or more user computers, the computer program configured to: identify and process data representative of a career ladder; identify and process data representative of at least one scholarship request; identify and process data representative of at least one training event; identify and process data representative of at least one participant; and communicate processed data representative of a career ladder, processed data representative of at least one scholarship request, and processed data representative of at least one training event to at least one participant; wherein the data representative of at least one scholarship request comprises data representative of at least one training session and data representative of a confirmation that any term(s) and condition(s) applicable to the scholarship request has/have been accepted by the requester, the data representative of at least one scholarship request further applicable to the data representative of at least one requirement.

50. The system of claim 35, wherein the data representative of at least one requirement comprises data representative of a requirement for advancement of at least one participant in accordance with the data representative of a first career ladder.

51. The system of claim 34, wherein the data representative of at least one requirement comprises data representative of at least one parameter.

52. The system of claim 34, further comprising data representative of a second career ladder, wherein said data is capable of being stored in and retrieved from the storage medium, wherein said data comprises data representative of a plurality of levels and wherein the data representative of a plurality of levels comprises data representative of at least one requirement, and wherein the processor is further configured to compare the data representative of at least one participant to the data representative of a second career ladder to determine if data representative of at least one participant attribute satisfies any or all of the data representative of at least one requirement of the data representative of a plurality of levels of the data representative of second career ladder.

53. The system of claim 34, further comprising a program stored upon the storage medium, said program operable by the processor upon the data representative of at least one career ladder.

54. The system of claim 34, wherein the data representative of at least one scholarship request further comprises data representative of at least one scholarship amount requested, and wherein the processor is further configured to compare data representative of at least one scholarship request to the data representative of at least one scholarship requirement to determine an amount of a scholarship based in part upon the data representative of at least one scholarship amount requested.

55. The system of claim 34, wherein the at least one approval process is performed by an administrator or is performed by the processor based upon data representative of at least one scholarship request and data representative of at least one scholarship requirement.

56. The system of claim 34, wherein the processor is further configured to compare data representative of at least one scholarship request to data representative of at least one scholarship requirement to determine if a scholarship request related to the data representative of at least one scholarship request is accurate and/or complete.

57. The system of claim 34, further comprising a storage medium operably connected to the processor, the storage medium capable of storing said data.

58. The system of claim 34, further comprising a program stored upon the storage medium, said program operable by the processor upon said data.

59. The system of claim 34, the system operably connected to at least one administrator computer and at least one participant computer through a network.

60. The system of claim 34, wherein the system is coupled within the administrator computer.

61. The system of claim 34, wherein the network comprises the Internet.

* * * * *